(12) United States Patent
Rodriguez

(10) Patent No.: US 11,798,110 B2
(45) Date of Patent: Oct. 24, 2023

(54) SYSTEMS AND METHODS FOR DETERMINING LAND USE DEVELOPMENT POTENTIAL

(71) Applicant: Gridics LLC, Miami, FL (US)

(72) Inventor: Max Enrique Zabala Rodriguez, Miami, FL (US)

(73) Assignee: Gridics LLC, Miami, FL (US)

( * ) Notice: Subject to any disclaimer, the term of this patent is extended or adjusted under 35 U.S.C. 154(b) by 649 days.

(21) Appl. No.: 16/789,681

(22) Filed: Feb. 13, 2020

(65) Prior Publication Data

US 2020/0258174 A1  Aug. 13, 2020

Related U.S. Application Data

(60) Provisional application No. 62/805,047, filed on Feb. 13, 2019.

(51) Int. Cl.
| | |
|---|---|
| *G06Q 50/16* | (2012.01) |
| *G06F 16/29* | (2019.01) |
| *G06T 17/10* | (2006.01) |

(52) U.S. Cl.
CPC .......... *G06Q 50/165* (2013.01); *G06F 16/29* (2019.01); *G06Q 50/163* (2013.01); *G06T 17/10* (2013.01)

(58) Field of Classification Search
None
See application file for complete search history.

(56) References Cited

U.S. PATENT DOCUMENTS

| | | | |
|---|---|---|---|
| 9,582,614 B2 | 2/2017 | Lee | |
| 9,892,474 B2 | 2/2018 | Wood et al. | |
| 10,025,887 B1* | 7/2018 | Santarone | G01S 5/14 |
| 10,074,145 B2 | 9/2018 | Budlong | |
| 2005/0114017 A1* | 5/2005 | Putnam | G09B 29/007 |
| | | | 701/532 |
| 2009/0094077 A1* | 4/2009 | Fosburgh | G06Q 50/165 |
| | | | 705/315 |
| 2011/0010134 A1* | 1/2011 | Balla | G06F 30/13 |
| | | | 726/21 |
| 2013/0132041 A1* | 5/2013 | Sigaty | G06Q 50/165 |
| | | | 703/1 |
| 2014/0046627 A1* | 2/2014 | Pershing | G06Q 10/06 |
| | | | 702/156 |
| 2014/0074736 A1* | 3/2014 | Carrington | G06F 16/24573 |
| | | | 705/313 |
| 2014/0278280 A1 | 9/2014 | Pardo-Fernandez | |
| 2015/0032479 A1* | 1/2015 | Schembari | G06Q 40/08 |
| | | | 705/317 |

(Continued)

OTHER PUBLICATIONS

Google, Google Map Help, Mar. 13, 2016, pp. 2-3. (Year: 2016).*

(Continued)

*Primary Examiner* — Sarah M Monfeldt
*Assistant Examiner* — Michael J. Monaghan
(74) *Attorney, Agent, or Firm* — NEO IP

(57) ABSTRACT

Systems and methods for determining land use development potential are provided, including a graphical user interface for real-time analysis. The systems and methods further implement search functions and real-time feedback and recommendations for real-time adjustment of a proposed land use development plan to ensure compliance with environmental and regulatory information.

20 Claims, 35 Drawing Sheets

(56) References Cited

U.S. PATENT DOCUMENTS

| | | | | |
|---|---|---|---|---|
| 2015/0154318 A1* | 6/2015 | Detwiler | ............... | G06Q 50/08 |
| | | | | 703/1 |
| 2015/0234946 A1* | 8/2015 | Teller | ..................... | G06F 30/13 |
| | | | | 703/1 |
| 2016/0048935 A1 | 2/2016 | Martinovic et al. | | |
| 2016/0063633 A1 | 3/2016 | Ross et al. | | |
| 2016/0110823 A1* | 4/2016 | Wood | ................... | G06Q 50/163 |
| | | | | 705/314 |
| 2016/0110824 A1* | 4/2016 | Zabala Rodriguez | . | G06Q 50/26 |
| | | | | 705/315 |
| 2017/0011548 A1 | 1/2017 | Sigaty et al. | | |
| 2017/0308549 A1* | 10/2017 | Sims | ..................... | G06Q 50/167 |
| 2017/0329875 A1 | 11/2017 | Detwiler et al. | | |
| 2018/0025452 A1* | 1/2018 | Fadeev | ............... | G06Q 50/165 |
| | | | | 705/315 |
| 2018/0268087 A1* | 9/2018 | Tierney | ................. | G06Q 50/08 |
| 2019/0066241 A1* | 2/2019 | Budlong | ................ | G06F 16/29 |
| 2019/0228486 A1* | 7/2019 | Crisci | .................. | G06Q 50/165 |
| 2019/0272669 A1* | 9/2019 | Esposito | ................ | G06F 40/30 |

OTHER PUBLICATIONS

K. Besserud and T. Hussey, "Urban design, urban simulation, and the need for computational tools," 2011, IBM Journal of Research and Development, vol. 55, No. 1.2, pp. 2:1-2:17. (Year: 2011).*

C. Demir and T. K. Koramaz, "GIS-based Procedural Modeling in Contemporary Urban Planning Practice," 2018, 22nd International Conference Information Visualisation (IV), Fisciano, Italy, pp. 553-560, (Year: 2018).*

* cited by examiner

SYSTEMS AND METHODS FOR DETERMINING LAND USE DEVELOPMENT POTENTIAL

CROSS REFERENCES TO RELATED APPLICATIONS

This application is related to and claims priority from the following US patents and patent applications. This application claims the benefit of U.S. provisional Application No. 62/805,047, filed Feb. 13, 2019, which is incorporated herein by reference in its entirety.

BACKGROUND OF THE INVENTION

1. Field of the Invention

The present invention relates to systems and methods for determining development potential of a tract of land and more specifically relates to analysis and modeling of the tract of land with real-time customization of potential land uses.

2. Description of the Prior Art

It is generally known in the prior art to provide computer-implemented methods and systems that allow users to obtain geographic information pertaining to a tract of land, to calculate maximum density capacity and intensity, and to create a 3D visualization of a building.

Prior art patent documents include the following:

U.S. Pat. No. 10,074,145 for methods for the transformation of complex zoning codes and regulations by inventor Budlong, filed Jun. 30, 2014 and issued Sep. 11, 2018, is directed to a computer implemented application to provide automated answers to zoning and real estate development questions by approaching the complex subject through the creation of modules representing the rules, property and process and accounting for user perspective. Real estate data, spatial data and municipal development codes, policy and zoning rules are transformed and translated into useable data enabling search, calculations, comparisons and visual display. The disclosed system facilitates zoning and/or land use development code impacts on a site selection search or specified location providing instant information about current and hypothetical building mass and use potential.

US Pub. No. 2017/0011548 for system and method for 3-d massing of a building envelope, by inventors Sigaty et al., filed Sep. 20, 2016 and published Jan. 12, 2017, is directed to a system and method that processes data and implements geographic based queries to allow users to visualize 3-D representations or massings of a building considering various zoning parameters for a real estate parcel. The user can choose to output the resulting information in digital and/or print format and perform 3-D massing for any lot or combination of lots on a city block. Using stored and/or input data, the system calculates the viability of the property as a real estate development investment by calculating a discounted cash flow (DCF) and/or an internal rate of return (IRR) and/or other investment metric values.

US Pub. No. 2014/0278280 for system and method for designing buildings by inventor Pardo-Fernandez, filed Mar. 14, 2014 and published Sep. 18, 2014, is directed to a system, a method and a computer program, including an online application software, that enable any user to input the address of a property site at any geographical location worldwide, where the user desires to erect a new building. The system includes a plurality of modules, including modules for residential, commercial and civic buildings in all community types, and through a series of steps guides a user along the process of assessing and determining the allowed buildable envelope, selecting desired building type, building program, construction system, architectural style, and level of environmental responsiveness, as well as intended construction budget. The system analyzes these data and produces building designs that comply with all local, state/provincial and federal/national applicable codes and regulations, embody a rigorous set of architectural, engineering and construction best practices and know-how, related to the specifics of the project, and best respond to the site constraints and user criteria.

US Pub No. 2016/0063633 for user interface for real estate development and communications platform by inventor Ross et al., filed Sep. 2, 2015 and published Mar. 3, 2016, is directed to a method to generate a visualization of real estate development data that may include receiving, at a communications module, source data from third party servers; inferring, at a data module, inferred location attributes from the source data; analyzing, at an analytics module, development opportunities and building potential of a selected property based on the inferred location attributes; analyzing, at the analytics module, zoning regulations and tax records of the selected property based on inferences made by the data module; calculating, at the analytics module, economic and tax potential of development capacity of a specified property; and/or creating, at a visualization module, a 3D representation of the development opportunities and building potential to display on a 3D map, based on the inferences made by the data module, as well as the calculations made by the analytics module.

US Pub No. 2016/0048935 for comprehensive quantitative and qualitative model for a real estate development project by inventor Martinovic et al., Oct. 28, 2015 and published Feb. 18, 2016, is directed to methods, systems, and apparatus, including computer programs encoded on a computer storage medium, for providing a user interface for specifying details of a development project, receiving, through the user interface, user-input specifying a type for the development project, a location for development project, and a financing structure for the development project, determining one or more projected outcomes for the development project based on data for the specified type, location, and financing structure of the development project, and, providing, through the user interface, an analysis of each of the one or more projected outcomes.

US Pub No. 2017/0329875 for computer-implemented land planning system and method with gis integration by inventor Detwiler et al., filed Aug. 1, 2017 and published Nov. 16, 2017, is directed to a computer-implemented land planning system designed to generate at least one conceptual fit solution to a user-defined land development problem. The system employs a computer readable medium and a computer program encoded on the medium. The computer program is operable, when executed on a computer, for electronically creating at least one candidate solution to the land development problem. The candidate solution incorporates a plurality of engineering measurements applicable in development of an undeveloped land site. Existing GIS data is collected for the selected undeveloped land site. A fitness function quantitatively evaluates the candidate solution based on its cost. A heuristic problem-solving strategy manipulates the engineering measurements of the candidate solution to achieve a more quantitatively fit solution to the land development problem. Documentation illustrating the fit solution to the land development problem is delivered to the user.

U.S. Pat. No. 9,892,474 for computing system and method for visualizing integrated real estate data by inventor Wood et al., filed Oct. 17, 2014 and issued Feb. 13, 2018, is directed to a computer-implemented method and a computing system for visualizing real-estate markets. The method includes obtaining property query data, locating and obtaining property data from a real estate database, locating and obtaining geospatial data associated with the one or more properties from a geographic information system (GIS) database based on the one or more criterion, correlating the property data with the geospatial data to provide correlation data, and generating visual indicators. The property query data includes data describing a request to identify one or more properties based on one or more criterion associated with the one or more properties. The property data and geospatial data are located based on the one or more criterion from the query data. The property data includes property location data and property feature data. The geospatial data includes geospatial coordinate data and geospatial image data. The visual indicators are generated based on the correlation data.

U.S. Pat. No. 9,582,614 for method and system for site and built environment information modeling and management by inventor Lee, filed on Jan. 28, 2013 and issued Feb. 28, 2017, is directed to a system, methods, and apparatus for modeling a site, such as a construction site. The site may include, for example, adding a new building to an existing city block, remodeling a building, re-developing an entire city/town, etc. Data may be gathered representing the site from a plurality of sources, and the data gathered may be used to determine how the new development affects the existing site. An interactive model may be generated that enables a user to walk through the site to visualize what the site will look like when completed. Hyperlinks to additional details about elements in the site may be provided.

SUMMARY OF THE INVENTION

The present invention relates to determining development potential for a tract of land. Specifically, the invention is directed to analysis and modeling development potential while applying environmental and regulatory measures. The tract of land could be a single piece of property, group of properties to be assembled or every property of an entire city.

It is an object of this invention to improve the real property analysis of prior art through systems and methods that provide real-time analysis and customization of the potential development of a tract of land. Further, the improvements of the present invention provide for an improved graphical user interface (GUI) to promote user efficiency. As opposed to systems of the prior art, embodiments of the present invention improve computer technology for analysis and modeling of building/development potential through real-time customization of applicable zoning code. The present invention also provides real-time feedback on whether designs meet the requirements of the appropriate regulatory body.

Prior art fails to provide real-time customization and feedback for potential building and land use systems. Prior art does not provide an efficient manner to enable a user to quickly find a tract of land that meets the unique, specific requirements of the user, such as maximum buildable area, density or allowed uses. Nor do these systems and methods enable a user to visualize the impact of their intended land use on the land of interest.

When submitting projects for zoning compliance, developers must submit their proposals to the appropriate regulatory board. It can be weeks or months before the developer receives any feedback about their proposal. In addition, typically, a regulatory board will examine an application until it finds something wrong or every element calculation and assumption has been validated for approval. If the regulatory board finds something wrong, the board will send its response to the developer and stop examining the application. The developer must correct the issue and resubmit the application, which often causes additional delays of weeks or even months. This process is repeated until the plan is approved and after it has cost the developer months of time. Therefore, there is a need for a solution that enables users to get real-time feedback on their proposed plan for a tract of land.

In addition, city officials want to determine how to efficiently re-zone parts or the entirety of the city. This could take months as all of the corresponding regulatory code must be examined. When determining how to re-zone a city, it is important to examine future development potential and utilities for an efficient evaluation. Therefore, there is a need for a system to enable a user to change the zoning code and obtain real-time analysis and modeling of the impact on the city from the changes.

Furthermore, none of the prior art discloses a system for land development analysis and visualization that includes a unique graphical user interface with search, compliance, and solution functions. Additionally, none of the prior art includes a user-friendly graphical user interface that enable users to achieve a high level of efficiency, visualization, problem-solving and insight into potential land development that was heretofore unavailable.

In one embodiment, a system for real-time analysis of a geographic area of interest including a computing platform constructed and configured for network communication with at least one remote device and at least one database, wherein the computing platform includes a search module, an analytics module, and a compliance module, wherein the at least one remote device includes a graphical user interface (GUI), software, memory, and a processor, wherein the software is executed by the processor, wherein the computing platform is configured to collect and transmit data corresponding to the geographic area of interest, wherein the data corresponding to the geographic area of interest includes geographic data, regulatory data, environmental data, building data, and custom data, wherein the custom data includes building input parameters, wherein the GUI is configured to receive the data corresponding to the geographic area of interest, wherein the at least one remote device is configured to transmit data to the computing platform, wherein the computing platform is configured to, using the data corresponding to the geographic area of interest, generate at least one building envelope and at least one 3D view for the geographic area of interest, wherein the at least one 3D view for the geographic area of interest is updated in real-time based on changes in the data corresponding to the geographic area of interest, wherein the computing platform is further configured to generate building analysis data, wherein the building analysis data includes the maximum actual building potential of the geographic area of interest, wherein the maximum actual building potential includes a maximum lot capacity, a maximum density, a maximum building area and a maximum building envelope, wherein the computing platform is configured to transmit the at least one building envelope data and the at least one 3D view for the geographic area of interest to the at least one remote device, wherein the computing platform is configured to color code the at least one 3D view for the geographic area of interest based on the custom data, wherein the GUI is configured to display the at least one building envelope and the at least one 3D view for the geographic area of interest, wherein the GUI is further configured to display a multiplicity of buildings on the geographic area of interest, wherein the multiplicity of buildings includes the at least one building envelope and preexisting buildings, wherein the computing platform is configured to determine if the at least one building envelope is allowable under at least one zoning code and/or at least one environmental factor for the geographic area of interest, wherein the GUI provides for updating the custom data to create updated custom data, wherein the computing platform is configured to analyze the updated custom data in real-time, and wherein the computing platform is configured to update the building analysis data in real-time based on the updated custom data.

In another embodiment, the present invention includes a method for real-time analysis of a geographic area of interest including receiving data about a geographic area of interest, wherein the geographic area of interest data includes geographic data, environmental data, regulatory data, and custom data, calculating, with a computing platform, at least one building envelope based on the custom data, calculating, with the computing platform, a maximum actual building potential for a geographic area of interest, determining if the geographic area of interest is operable to support the custom data, wherein the computing platform is configured to send an alert to a graphical user interface (GUI), wherein the GUI is configured to display the alert when the geographic area of interest is not operable to support the custom data, providing recommendations to change the custom data, wherein the geographic area of interest is operable to support the recommended changes to the custom data, updating the custom data, and creating a 3D model of the geographic area of interest with the updated custom data.

In another embodiment, the present invention is directed to a system for real-time analysis of a geographic area of interest including a computing platform constructed and configured for network communication with at least one remote device and at least one database, wherein the computing platform including a search module, an analytics module, and a compliance module, wherein the at least one remote device including a graphical user interface (GUI), software, memory, and a processor, wherein the software is executed by the processor, wherein the computing platform is configured to collect and transmit data corresponding to the geographic area of interest, wherein the data corresponding to the geographic area of interest includes geographic data, regulatory data, environmental data, building data, and custom data, wherein the building data includes a building type, wherein the GUI is configured to receive the data corresponding to the geographic area of interest, wherein the at least one remote device is configured to transmit data to the computing platform, wherein the computing platform is further configured to generate building analysis data, wherein the building analysis data includes a building envelope and the maximum actual building potential of the geographic area of interest, wherein the maximum actual building potential includes a maximum lot capacity, a maximum density, a maximum building area, and a maximum building envelope, wherein the computing platform is configured to determine if the at least one building envelope and the building type are allowable under at least one zoning code and/or at least one environmental factor for the geographic area of interest, wherein the computing platform is configured to determine a different building type that is allowable under the at least one zoning code and/or at least one environmental factor, wherein the GUI is configured for updating the custom data to create updated custom data, wherein the computing platform is configured to analyze the updated custom data in real-time, and wherein the computing platform is configured to update the building analysis data in real-time based on the updated custom data.

These and other aspects of the present invention will become apparent to those skilled in the art after a reading of the following description of the preferred embodiment when considered with the drawings, as they support the present invention.

Referring now to the drawings in general, the illustrations are for the purpose of describing one or more preferred embodiments of the invention and are not intended to limit the invention thereto.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 19 illustrates a zoning results output of zoning code issues according to one embodiment of the present invention.

FIG. 37 illustrates a GUI showing the zoning code information according to one embodiment of the present invention.

FIG. 38 illustrates a GUI showing the zoning code information according to one embodiment of the present invention.

FIG. 39 is a schematic diagram of a cloud-based system of the present invention according to one embodiment of the present invention.

DETAILED DESCRIPTION

Figure 1:
FIG. 1 illustrates a GUI showing a large tract of land according to one embodiment of the present invention.

The present invention is generally directed to determining development potential of a tract of land. The invention generally includes systems and methods directed to collecting relevant geographic information for a particular tract of land, analyzing the relevant geographic data to determine the actual maximum density and intensity allowed, and outputting the results to a graphical user interface. The systems and methods of the present invention provide for improved analysis, search functions, and efficiency of land development potential.

In one embodiment, a system for real-time analysis of a geographic area of interest including a computing platform constructed and configured for network communication with at least one remote device and at least one database, wherein the computing platform includes a search module, an analytics module, and a compliance module, wherein the at least one remote device includes a graphical user interface (GUI), software, memory, and a processor, wherein the software is executed by the processor, wherein the computing platform is configured to collect and transmit data corresponding to the geographic area of interest, wherein the data corresponding to the geographic area of interest includes geographic data, regulatory data, environmental data, building data, and custom data, wherein the custom data includes building input parameters, wherein the GUI is configured to receive the data corresponding to the geographic area of interest, wherein the at least one remote device is configured to transmit data to the computing platform, wherein the computing platform is configured to, using the data corresponding to the geographic area of interest, generate at least one building envelope and at least one 3D view for the geographic area of interest, wherein the at least one 3D view for the geographic area of interest is updated in real-time based on changes in the data corresponding to the geographic area of interest, wherein the computing platform is further configured to generate building analysis data, wherein the building analysis data includes the maximum actual building potential of the geographic area of interest, wherein the maximum actual building potential includes a maximum lot capacity, a maximum density, a maximum building area and a maximum building envelope, wherein the computing platform is configured to transmit the at least one building envelope data and the at least one 3D view for the geographic area of interest to the at least one remote device, wherein the computing platform is configured to color code the at least one 3D view for the geographic area of interest based on the custom data, wherein the GUI is configured to display the at least one building envelope and the at least one 3D view for the geographic area of interest, wherein the GUI is further configured to display a multiplicity of buildings on the geographic area of interest, wherein the multiplicity of buildings includes the at least one building envelope and preexisting buildings, wherein the computing platform is configured to determine if the at least one building envelope is allowable under at least one zoning code and/or at least one environmental factor for the geographic area of interest, wherein the GUI provides for updating the custom data to create updated custom data, wherein the computing platform is configured to analyze the updated custom data in real-time, and wherein the computing platform is configured to update the building analysis data in real-time based on the updated custom data.

In another embodiment, the computing platform is configured to search a multiplicity of geographic areas of interest based on the at least one zoning code, the at least one building envelope, and the custom data, and wherein the computing platform is configured to determine a geographic area of interest of the multiplicity of geographic areas of interest that best matches the custom data. The GUI is operable to search for the geographic area of interest based on property dimensions, area, demographics, zoning designation, abutting streets, allowed density, allowed intensity, allowed non-residential uses, allowed height, allowed buildable area, and/or geolocation characteristics. The computing platform is configured to identify non-compliant custom data, wherein the non-compliant custom data is not allowable under the zoning code and/or the maximum actual building potential, wherein the computing platform is configured to send alerts about the non-compliant custom data to the at least one remote device, wherein the GUI is operable to displays alerts about the non-compliant custom data. The GUI is configured to receive a selection for the geographic area of interest, wherein the computing platform is configured to collect and transmit legal data for the geographic area of interest to the GUI, wherein the GUI is configured to display the legal data, and wherein the legal data includes legal description data, ownership data, neighborhood data, transportation data, and encumbrance data. The GUI is configured to filter geographic areas of interest by property use, lot size, municipal zoning code, county zoning code, municipal zoning overlay, land use, Department of Revenue (DOR) code land use, city future land use, county future land use, last record sale price, and/or last record sale date. The GUI is operable to allow modification of the shape, size, height, and width of the at least one 3D view of the geographic area of interest via selecting and dragging elements of the geographic area of interest. The GUI is operable to receive a selection of a multiplicity of geographic areas of interest, wherein the computing platform is configured to analyze individual and combined geographic areas of interest of the multiplicity of geographic areas of interest, and wherein the computing platform is further configured to determine a combination of geographic areas of interest of the multiplicity of geographic areas of interest that are operable to support the at least one building envelope. The computing platform is configured to color code tracts of the geographic area of interest based on whether or not the tracts of geographic area of interest are operable to support the building input parameters. The GUI is operable to display a multi-tract building, wherein the GUI is operable to allow modification of building elements on individual tracts and/or buildings that comprise the multi-tract building. The computing platform is configured to determine infrastructure demands on the geographic area of interest and wherein the computing platform is configured to recommend changes to increase or decrease the infrastructure demands. The computing platform is configured to search for a first geographic area of interest within a distance of a second geographic area of interest, and wherein the computing platform is configured to determine if a part of the first geographic area of interest is operable to support the at least one building envelope.

In another embodiment, the present invention includes a method for real-time analysis of a geographic area of interest including receiving data about a geographic area of interest, wherein the geographic area of interest data includes geographic data, environmental data, regulatory data, and custom data, calculating, with a computing platform, at least one building envelope based on the custom data, calculating, with the computing platform, a maximum actual building potential for a geographic area of interest, determining if the geographic area of interest is operable to support the custom data, wherein the computing platform is configured to send an alert to a graphical user interface (GUI), wherein the GUI is configured to display the alert when the geographic area of interest is not operable to support the custom data, providing recommendations to change the custom data, wherein the geographic area of interest is operable to support the recommended changes to the custom data, updating the custom data, and creating a 3D model of the geographic area of interest with the updated custom data.

The GUI is operable to filter and search at least one geographic area of interest by building parameters, wherein the building parameters include area, density, development, floor area ratio, folio number, jurisdiction, land use type, max height, max lot coverage, minimum lot size, minimum lot width, quantity of properties, quantity of transit routes, quantity of transit stops, street, total property size, water body and water body type. The computing platform is configured to provide recommendations for a second geographic area of interest that is operable to support the custom data. Further comprising determining infrastructure demands on a geographic area of interest, wherein the computing platform is configured to recommend changes to increase or decrease infrastructure demands.

In another embodiment, the present invention is directed to a system for real-time analysis of a geographic area of interest including a computing platform constructed and configured for network communication with at least one remote device and at least one database, wherein the computing platform including a search module, an analytics module, and a compliance module, wherein the at least one remote device including a graphical user interface (GUI), software, memory, and a processor, wherein the software is executed by the processor, wherein the computing platform is configured to collect and transmit data corresponding to the geographic area of interest, wherein the data corresponding to the geographic area of interest includes geographic data, regulatory data, environmental data, building data, and custom data, wherein the building data includes a building type, wherein the GUI is configured to receive the data corresponding to the geographic area of interest, wherein the at least one remote device is configured to transmit data to the computing platform, wherein the computing platform is further configured to generate building analysis data, wherein the building analysis data includes a building envelope and the maximum actual building potential of the geographic area of interest, wherein the maximum actual building potential includes a maximum lot capacity, a maximum density, a maximum building area, and a maximum building envelope, wherein the computing platform is configured to determine if the at least one building envelope and the building type are allowable under at least one zoning code and/or at least one environmental factor for the geographic area of interest, wherein the computing platform is configured to determine a different building type that is allowable under the at least one zoning code and/or at least one environmental factor, wherein the GUI is configured for updating the custom data to create updated custom data, wherein the computing platform is configured to analyze the updated custom data in real-time, and wherein the computing platform is configured to update the building analysis data in real-time based on the updated custom data.

The computing platform is configured to search a multiplicity of geographic areas of interest based on the at least one zoning code, the building envelope generated, and the custom data, and wherein the computing platform is configured to determine a geographic area of interest of the multiplicity of geographic areas of interest that best matches the custom data. The computing platform is configured to identify non-compliant custom data, wherein the non-compliant custom data is not allowable under the zoning code and/or the maximum actual building potential, wherein the at least one computing platform is configured to send alerts about the non-compliant custom data to the at least one remote device, and wherein the GUI is operable to displays alerts about the non-compliant custom data. The GUI is operable to display a multi-tract building, wherein the GUI is operable to allow modification of building elements on individual tracts and/or buildings that comprise the multi-tract building.

None of the prior art discloses a unique graphical user interface that provides visualization features including sliders, drag and click functionality, on-screen buttons for analysis and to improve user visibility, separable building components, the ability to modify building parameters and save those parameters as templates, or the ability to analyze land development potential in real time or near real time. Furthermore, none of the prior art provides the unique features of the graphical user interface which improve the usability of land development potential systems compared to the prior art. Additionally, none of the prior art includes analysis of a proposed building plan including the effects on utility services, such as water treatment and waste management, and the impact on the land.

In one embodiment, the present invention is configured to receive geographic information for a tract of land. The present invention is also configured to receive custom user input information, such as a building design. The present invention is configured to receive regulatory information, ex. zoning code, for the tract of land. The present invention is configured to use the geographic, custom user, and regulatory information to determine the actual maximum density capacity and intensity for the tract of land. The present invention displays the results onto a graphical user interface. The graphical user interface is configured to enable the user to change the user input information in real-time. The displayed information is updated in real-time.

In one embodiment, the present invention is configured to simultaneously display multiple buildings within the same city. Alternatively, the present invention is configured to display an entire city. The real-time customization allows a user to run hypothetical scenarios. These hypothetical scenarios include rezoning the entire city and changing the setback regulations.

In another embodiment, the present invention includes a search function. The search function enables a user to search an area for certain parameters that meet the user's needs. The present invention displays the potential locations that meet the parameters. The present invention is operable to allow a user to search based on property dimensions or area, demographics, zoning designation, abutting streets, allowed density, allowed intensity, allowed non-residential uses, allowed height, allowed buildable area, geolocation characteristics and other public record information. In one embodiment, the results are displayed via a 3D visualization. The present invention is configured to color code the displayed results. In one embodiment, the color code configuration allows users to see which potential area best fits a set of parameters.

In yet another embodiment, the present invention provides semi-automatic or automatic approval or denial of a proposed building plan.

FIG. 1 illustrates one embodiment of the present invention, wherein the system includes a display screen with a graphical user interface of a large tract of land. In this example embodiment, the large tract of land is North America. The graphical user interface is configured to highlight cities or locations which include searchable tracts of land. The graphical user interface is configured to allow a user to set a default city. In general, prior art does not include a graphical user interface that allows a user to search across a tract of land as large as the United States.

Figure 2:
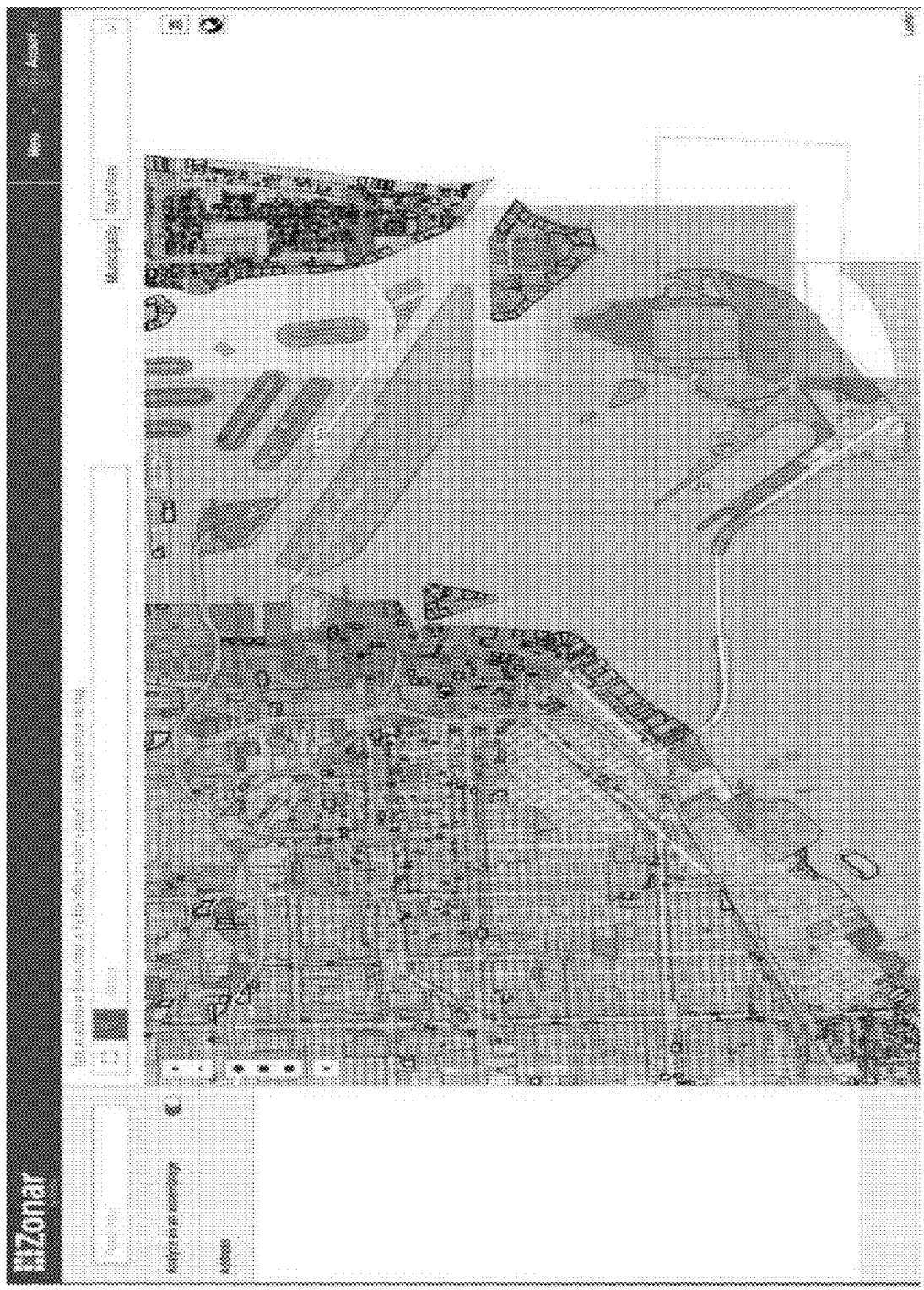
FIG. 2 illustrates a GUI showing a municipality according to one embodiment of the present invention.

FIG. 2 illustrates another embodiment of the present invention, wherein the system is configured to display an entire municipality or city. The graphical user interface is configured to allow analysis of a tract of land as an assemblage via a slider. In this embodiment, slider movement in one direction causes the system to analyze a tract of land as an assemblage. Slider movement in the opposite direction causes the system to analyze the tract of land as an individual piece of property. The present invention is operable to find single or multiple parcels of land via an input address. The system is configured to use the zoning information to color code the various parcels of land on display. The present invention enables users to quickly and freely analyze the boundaries of a building plan on a tract of land. Prior art requires a user to input specific information so a user does not have the ability to quickly and freely change a proposed building plan and thereby increasing the amount of time and effort needed to run hypothetical scenarios. In addition, the graphical user interface of the present invention is operable to display different zoning codes in a color coded manner.

Figure 3:
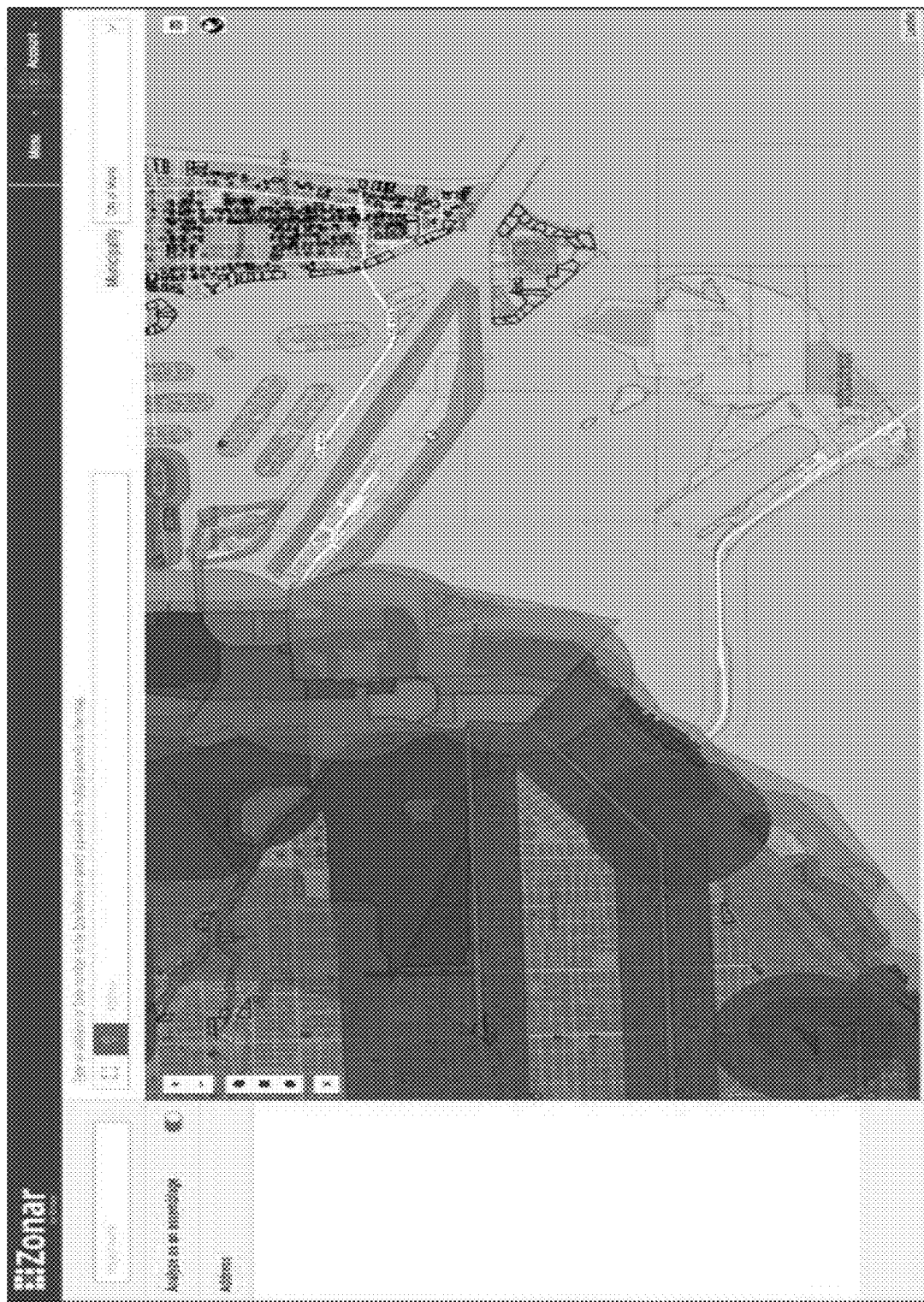
FIG. 3 illustrates a GUI showing zoning districts and overlays over a municipality according to one embodiment of the present invention.

FIG. 3 illustrates a color coded representation of a municipality. The graphical user interface is operable to use different geometries, ex. circle, square, pentagon etc., to represent various zoning overlays and color code the various geometries to represent the zoning category. The graphical user interface is configured for a user to draw an area of interest. The present invention is configured to display the selected area of interest with the corresponding zoning overlays.

Figure 4:
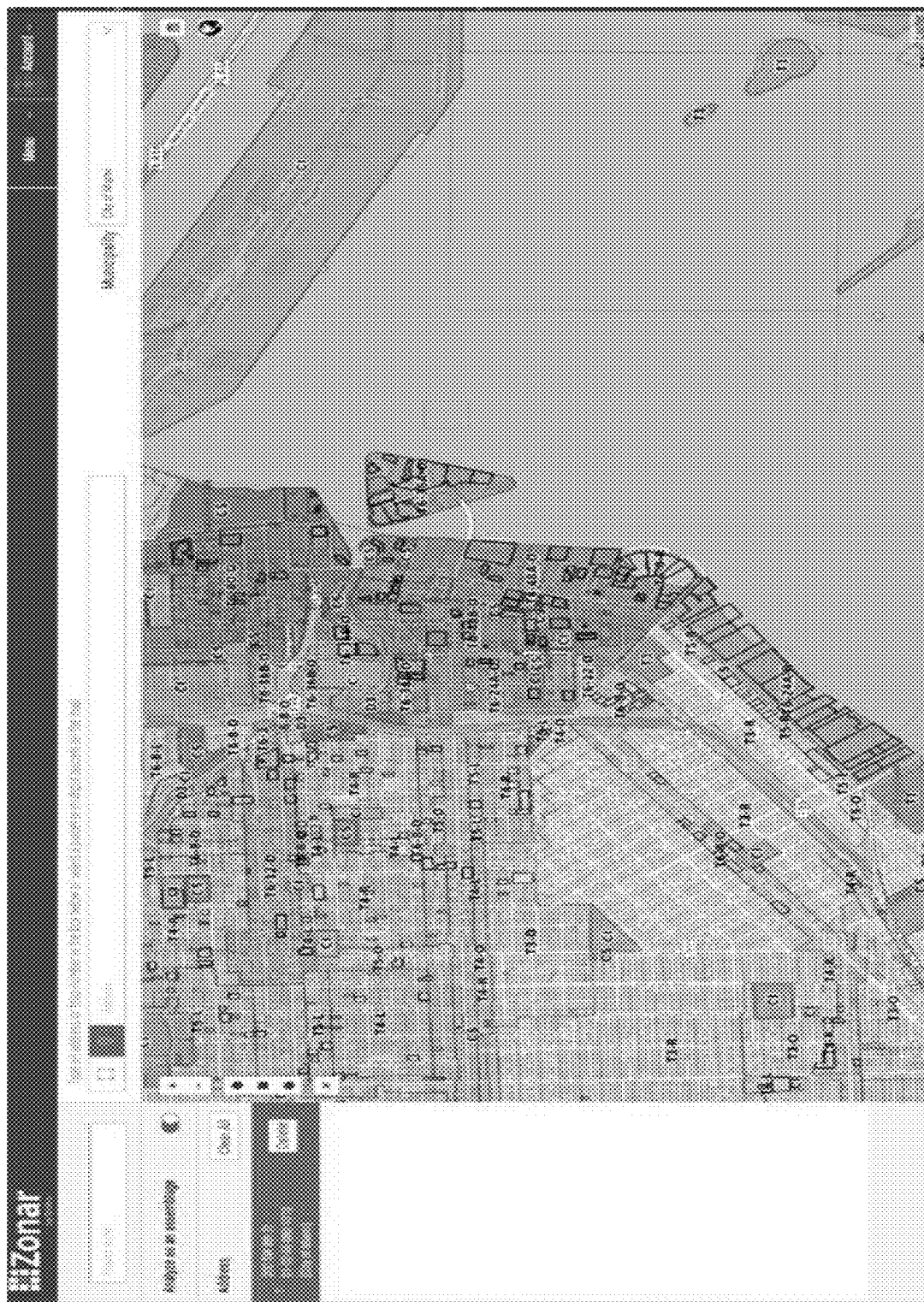
FIG. 4 illustrates a GUI showing a municipality with labeled zoning districts according to one embodiment of the present invention.

FIG. 4 illustrates one embodiment of the present invention, wherein the system is configured to display the specific zoning ordinance for each parcel of land. The graphical user interface is configured to receive a selection of various tracts of land. The graphical user interface is operable to receive a selection of various tracts of land via user input information. The graphical user interface is operable to receive multiple addresses, thereby enabling a user to analyze a proposed building plan for multiple addresses at the same time. In one embodiment, upon the graphical user interface receiving the selection of a tract of land, the graphical user interface displays the address for the tract of land. In another embodiment, the selection of the tract of land is received via click selection. Alternatively, selection of the tract of land is received via a touchscreen input.

Figure 5:
FIG. 5 illustrates a GUI showing a 3D representation of a building according to one embodiment of the present invention.

FIG. 5 illustrates another embodiment of the present invention, wherein the graphical user interface is configured to display a 3D representation of a building on a selected tract of land. The graphical user interface is configured to allow a user to input the building parameters as desired. The displayed information includes the maximum lot capacity, the allowed uses, and the allowed frontages types. The graphical user interface is operable to allow a user to change various parameters about the lot information in real-time. For example, a user can change the zoning code, zone, sub-zone, type, building type, lot area, selected frontage, and thoroughfare type. The system is also configured to notify the user of multiple building types and lot area discrepancy via the graphical user interface. This ensures that the proposed building plan is as the user intended and that the proposed building plan is in compliance with regulatory and zoning information.

Figure 6:
FIG. 6 illustrates a GUI showing a 3D representation of a building with setback limits according to one embodiment of the present invention.

FIG. 6 illustrates one embodiment of the present invention, wherein the system is configured to analyze the lot information, including the zoning code, building type, and frontage type, with the setback limit to determine the actual maximum density capacity and intensity of the tract of land. The system is also configured to use environmental factors in its analysis. For example, the environmental factors include topography, soil conditions, and climate. The system is configured to send the results of the analysis to the graphical user interface. The graphical user interface is operable to display a 3D representation of a building from the results of the analysis. The graphical user interface is configured to include the building setback limit and the lot with the 3D representation of the building. The various building components are color coded, thereby enabling a user to visualize the actual maximum density capacity of the tract of land and building. The graphical user interface also applies the maximum lot capacity information. The maximum lot capacity information includes lot area, lot area in acres, dwelling units per acre, dwelling units allowed, floors, lot coverage, minimum open space, principal building maximum level, principal building maximum height, principal building minimum level, principal tower allowed height, total maximum height, maximum built area, maximum building footprint, maximum residential tower footprint, maximum commercial tower footprint, maximum residential area, maximum lodging area, maximum office area, and maximum office height. In another embodiment, multiple three dimensional models of buildings are simultaneously displayed for one lot, with each building having a different color. The three dimensional models of the buildings are preferably translucent. In one embodiment, the shape, size, height, width, etc. of the three dimensional models are operable to be changed through manipulation of the three dimensional models. This manipulation includes, by way of example and not limitation, click selection including drag select and touchscreen selection. Unlike the present invention, prior art fails to include the visualization of building setbacks and lot requirements. Furthermore, the present invention is operable to display preexisting buildings in a real-world view. This allows a user to visualize how a proposed building plan will look in comparison to structures that currently exist on nearby land.

Figure 7:
FIG. 7 illustrates a GUI for designing a building according to one embodiment of the present invention.

FIG. 7 illustrates another embodiment of the present invention, wherein the system is configured to analyze the capacity of the tract of land. The system is configured to allow a user to change various parameters to visualize hypothetical building scenarios. The graphical user interface is configured to show whether the user's parameters are feasible for the intended location. The graphical user interface includes sliders for the various parameters. A user can move the slider in one direction to increase the value of a parameter and move the slider in the other direction to decrease the value of the parameter. The building parameters include residential dwelling units, dwelling unit average gross area, lodging rooms, lodging room average gross area, office net area, industrial net area and commercial net area. Additionally, or alternatively, the building parameters include industrial, institutional, and civic uses or considerations. The system is configured to include parking requirements and common spaces in its analysis. The system is operable to provide alerts that indicate when the building height minimum is not met and when multiple building types are present.

Figure 8:
FIG. 8 illustrates a GUI for a proposed building design according to one embodiment of the present invention.

FIG. 8 illustrates another embodiment of the present invention, wherein the graphical user interface is configured to display in real-time the increase or decrease of a building parameter via the movement of a slider. The system is configured to notify when one of the user's parameters does not conform to the various geographic or regulatory restraints on the tract of land. For example, if a user exceeds the maximum residential dwelling units, the system is configured to display a notification that indicates the user needs to modify the sliders to decrease the parameter to correct the issue. Also, the system is operable to notify the user that no room is left for the dwelling area under the summary portion of the graphical user interface. This enables a user to adjust its proposed building plan in real-time and the sliders on the graphical user interface enable a user to accurately determine the necessary changes for the building plan to meet the necessary requirements. In the prior art, a user would have to estimate what changes were necessary to satisfy the requirements.

Figure 9:
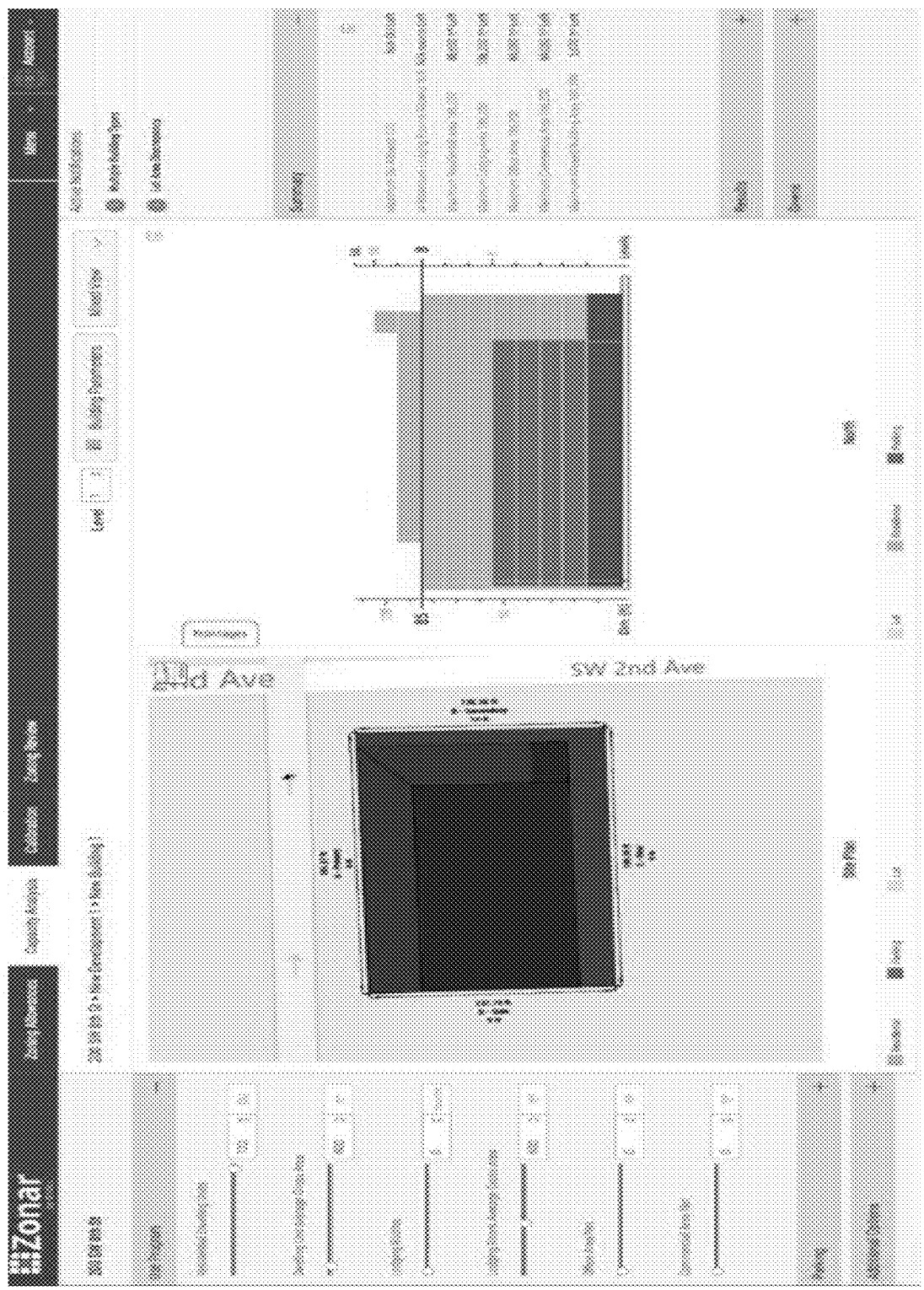
FIG. 9 illustrates a 2D view for a building design according to one embodiment of the present invention.

FIG. 9 illustrates another embodiment of the present invention, wherein the system includes a mixed view of the proposed building design. The mixed view includes a two-dimensional figure that displays an aerial view of the building. The two-dimensional figure includes various color coded components for residential, parking and lot area. The user is also able to visualize setback limits such as see how far each side is from nearby streets. The mixed view further includes a two-dimensional figure that includes the dimensions and levels of the building. The graphical user interface is operable to change and display the 2D view on a level-by-level view.

Figure 10:
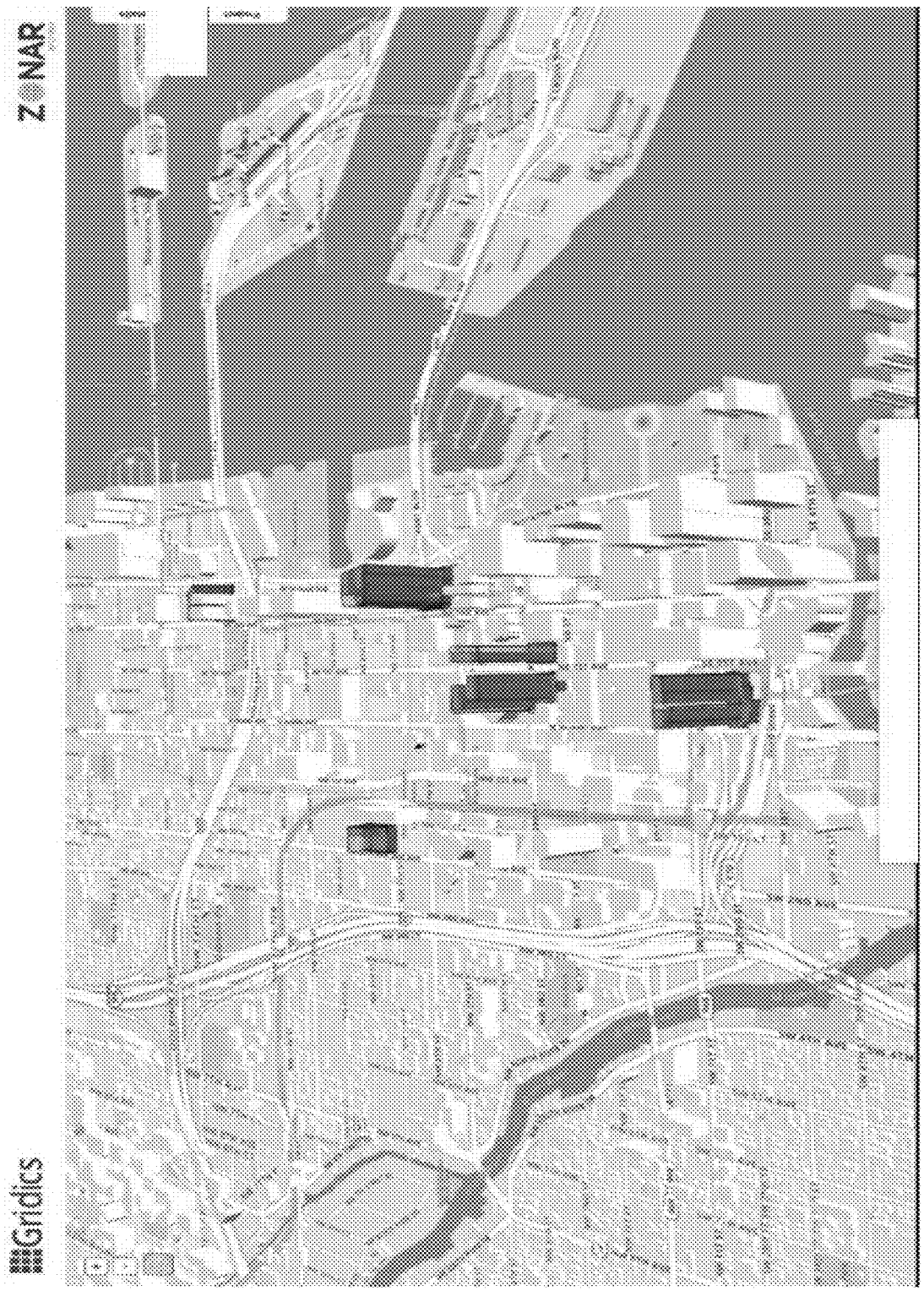
FIG. 10 illustrates a GUI showing a municipality according to one embodiment of the present invention.

FIG. 10 illustrates another embodiment of the present invention, wherein the graphical user interface is configured to display a city with buildings on multiple tracts of land. The buildings are color coded to show which buildings or tracts of land are available for the input parameters. For example, the graphical user interface is configured to color the incompatible tracts of land as white and the compatible tracts of land as blue.

Figure 11:
FIG. 11 illustrates a GUI showing a multi-lot building design according to one embodiment of the present invention.

FIG. 11 illustrates another embodiment of the present invention, wherein the graphical user interface is configured to display a multi-lot building. The system is operable to notify the user of tower separation, multiple building types, and lot area discrepancy via the graphical user interface. The graphical user interface is operable to allow a user to focus on individual lots and buildings that comprise the multi-lot building. The system is operable to color code the main building, the building setback limit and the lot. The graphical user interface includes a zoning allowances component, a capacity analysis component, a calibration component, and a zoning review component.

Figure 12:
FIG. 12 illustrates a GUI showing a proposed building design according to one embodiment of the present invention.

FIG. 12 illustrates one embodiment of the present invention wherein the system is configured to notify the user of a pedestrian or vehicular passage that affects the tract of land.

Figure 13:
FIG. 13 illustrates a GUI for modifying zoning codes according to one embodiment of the present invention.

FIG. 13 illustrates another embodiment of the present invention wherein the system includes a calibration component. The calibration component includes the following categories: zoning code properties, modules, components, zones, uses, settings, proximity, abutting, shared parking, overlay/typology, variances, and frontages. The calibration component includes a table with various zoning codes. The system is configured to calibrate the proposed building plan with the property of interest to determine the maximum level, maximum height, and maximum base size. The calibration component allows for changes, modifications or additions to the zoning regulations. Municipalities amend these zoning regulations several times during each year, and the calibration section allows for updating the resulting calculations and information based on the requirements. In one embodiment, the calibration component is updated in real-time or near real-time.

Figure 14:
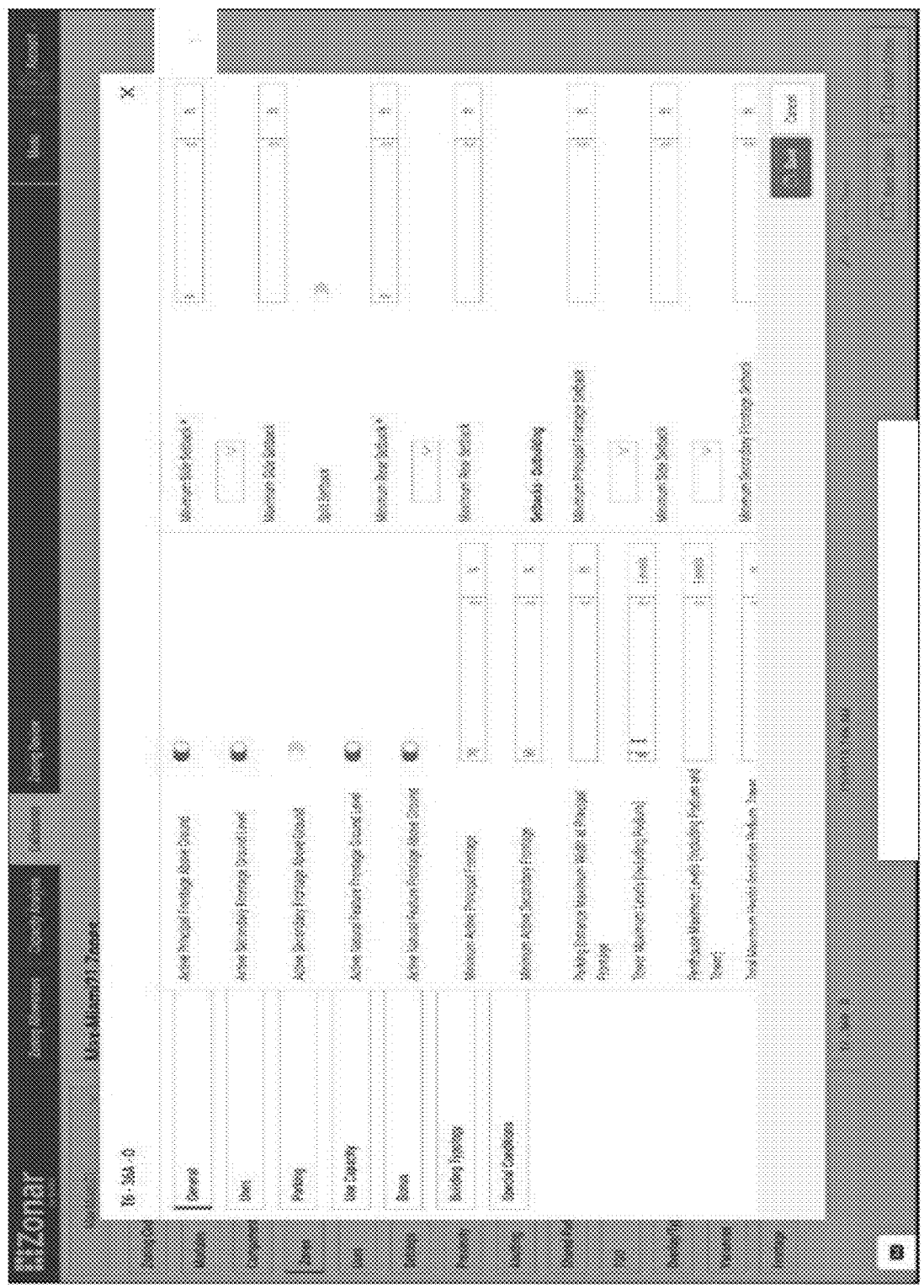
FIG. 14 illustrates a GUI showing modification of a zoning code according to one embodiment of the present invention.

FIG. 14 illustrates one embodiment of the present invention wherein a user can modify a zoning code to see how it would affect the tract of land. For example and not limitation, the parameters that a user can change are: active principal frontage above ground, active secondary frontage ground level, active secondary frontage above ground, active natural feature frontage ground level, active natural feature frontage above ground, minimum active principal footage, minimum active secondary footage, parking entrance maximum width at principal frontage, tower maximum levels (including podium), penthouse maximum levels (including podium and tower), total maximum height (including podium tower), minimum rear setback, maximum side setback, split setback, minimum rear setback, maximum rear setback, maximum rear setback, minimum principal frontage setback, minimum side setback, and minimum secondary frontage setback. A user can also change the uses, parking, use capacity, bonus, building typology and special conditions under the zoning conditions. Prior art fails to disclose a unique combination of adjustable parameters as in the present invention that enables a user to completely customize and evaluate a potential building plan.

Figure 15:
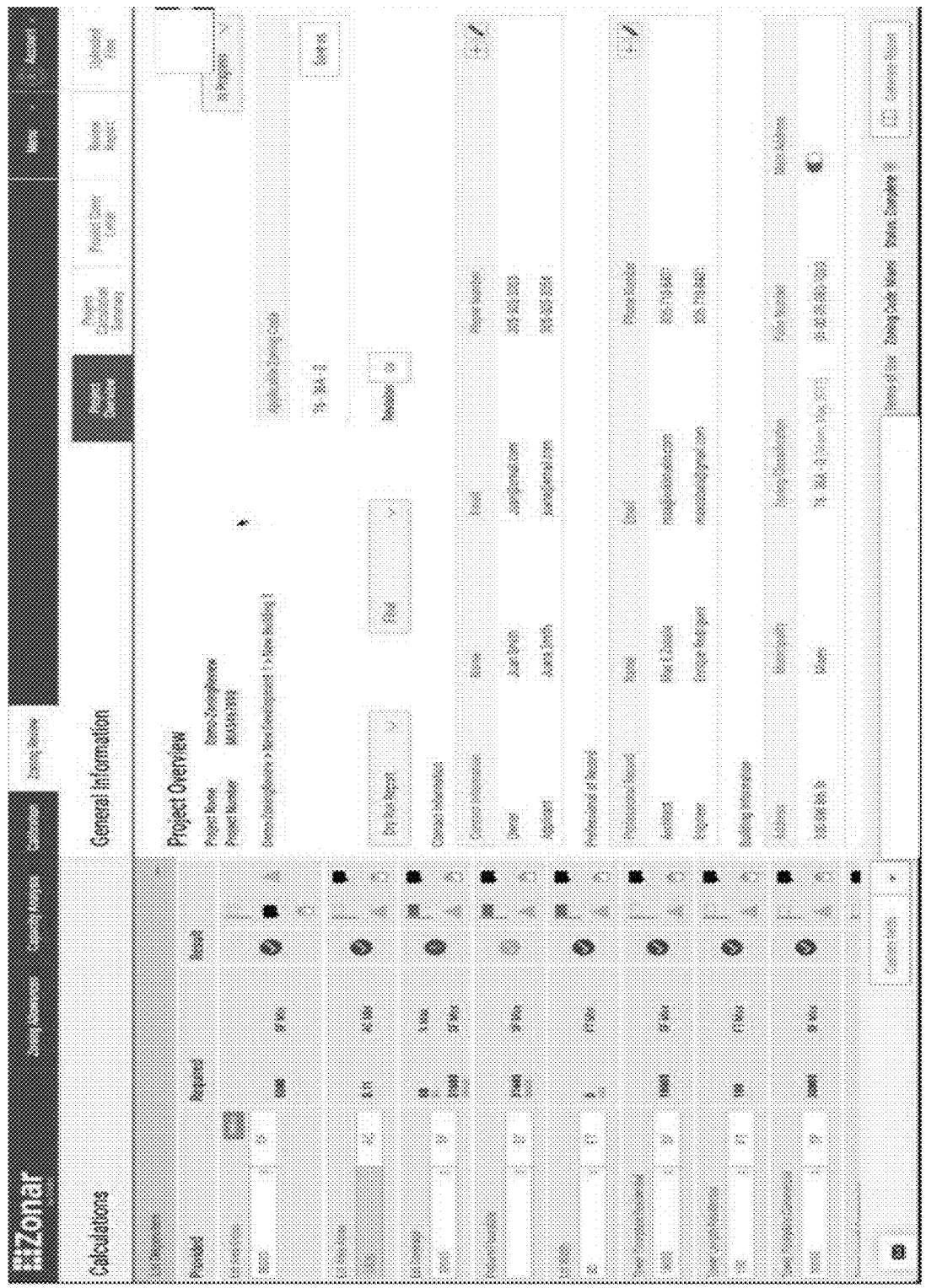
FIG. 15 illustrates a GUI showing a zoning review component according to one embodiment of the present invention.
Figure 16:
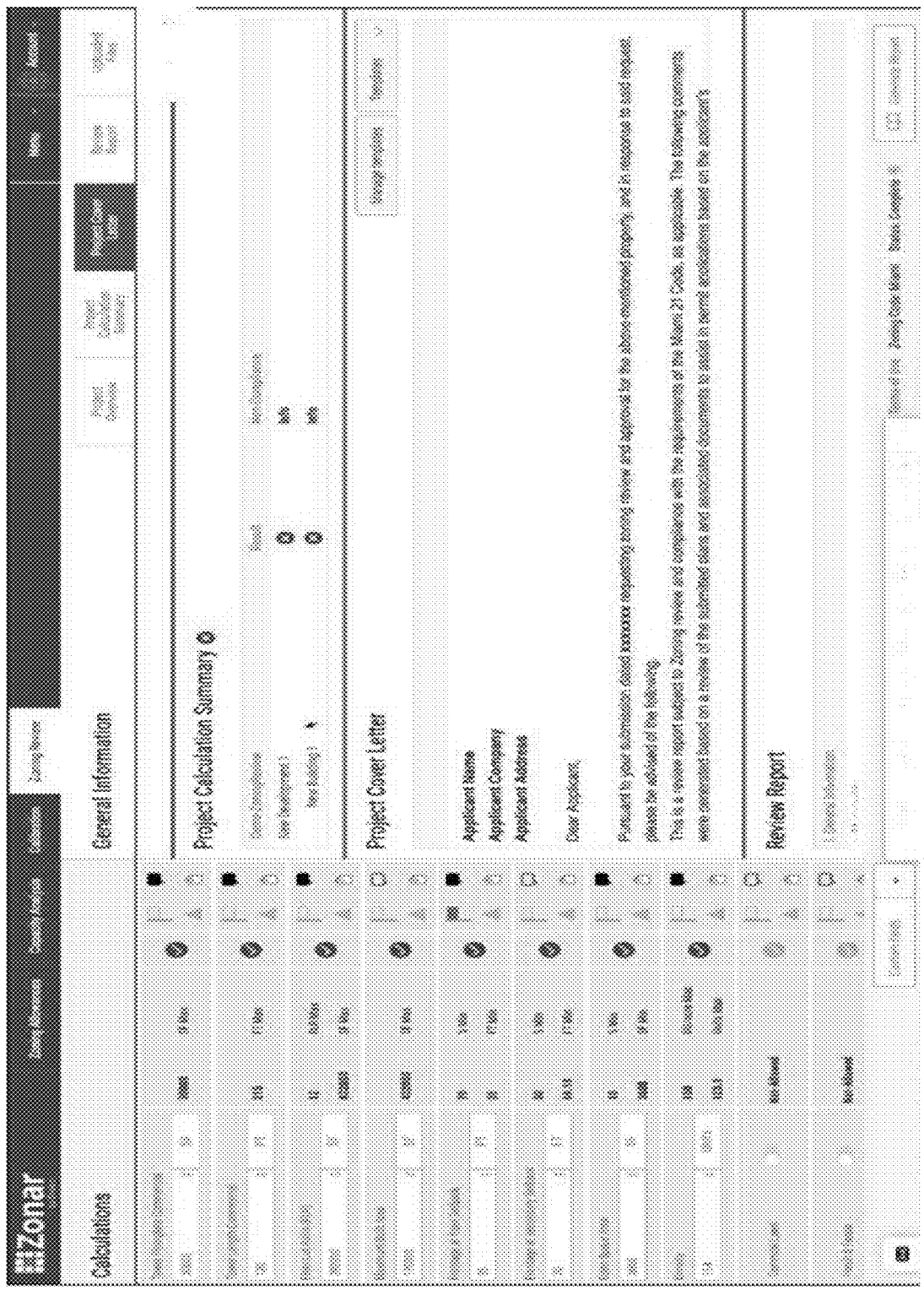
FIG. 16 illustrates a GUI showing a sample zoning review and approval letter according to one embodiment of the present invention.
Figure 17:
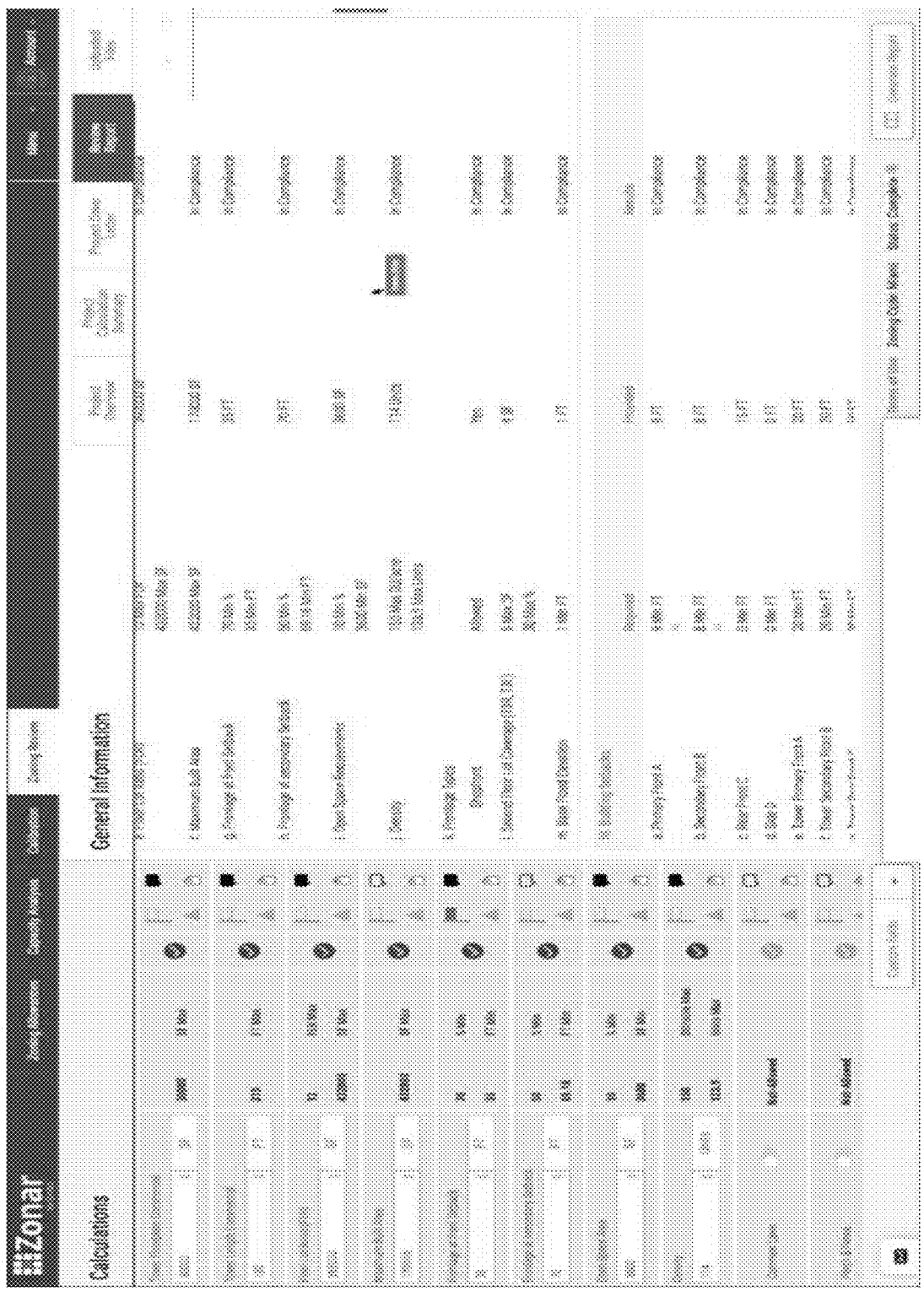
FIG. 17 illustrates a GUI showing a review report according to one embodiment of the present invention.
Figure 18:
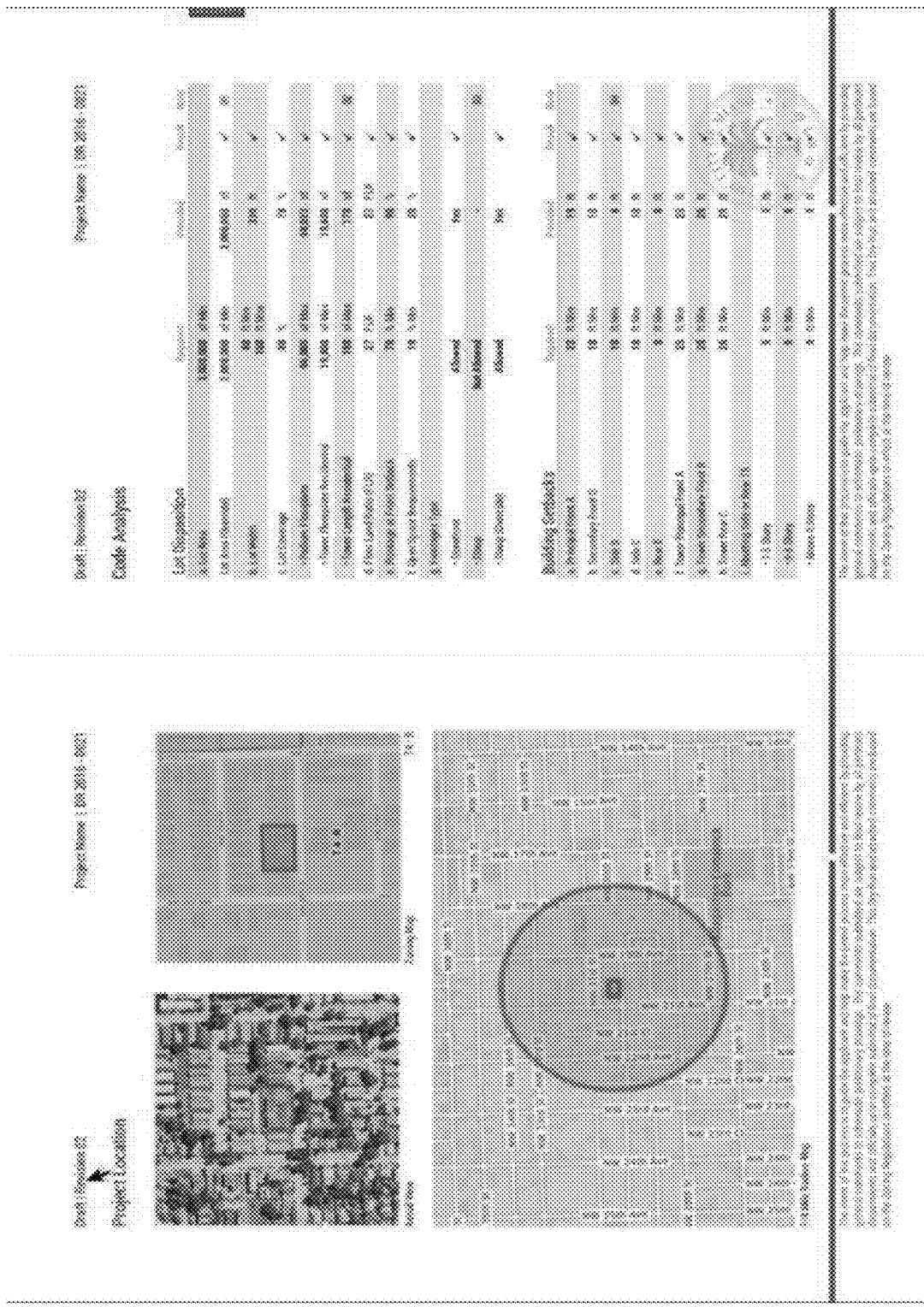
FIG. 18 illustrates a sample analysis report according to one embodiment of the present invention.

FIG. 15 illustrates another embodiment of the present invention where the system includes a zoning review component. The zoning review component enables a user to run a report based on the selected user information and regulatory information. The zoning review component displays the provided parameters for the lot and indicates which parameters meet the compliance standards and which ones do not. In addition, the system includes report capabilities. For example, as shown in FIG. 16, the system is operable for a user to run a "dry report" to simulate submitting a building plan for a zoning review and approval. The Review Letter as shown in FIG. 17 notifies the user which parts of the proposed business plan are in compliance with the local zoning laws and which parts are not in compliance with the zoning laws. As shown in FIG. 18, the "Dry Run" report includes an aerial view zoning map and a radius map for the property of interest. Also, the "Dry Run" report includes compliance analysis for various parameters of the lot disposition and the building setbacks. This information is provided in a table to enable a user to visualize whether or not their plan is in compliance with zoning law. Furthermore, the report is configured to provide recommendations on how to make the proposed building plan compliant with the local zoning laws and other regulatory requirements. The unique combination of analysis and displayed results in the present invention is an improvement over the prior art and an improvement to computer technology and GUIs.

In another embodiment, the system is configured to display the relevant zoning code to a user. As shown in FIG. 19, the system is operable to provide an explanation of the relevant zoning code and if the proposed building is compliant with the particular section of code. The system is also configured to provide recommendations to make a proposed building plan compliant with the zoning code. For example, the system is operable to notify the user to equally space the trees along a street or to provide the required irrigation plan when applying for a building permit. None of the prior art discloses the comprehensive analysis and solution recommendations in the present invention.

Figure 20:
FIG. 20 illustrates a GUI showing a municipality according to one embodiment of the present invention.
Figure 21:
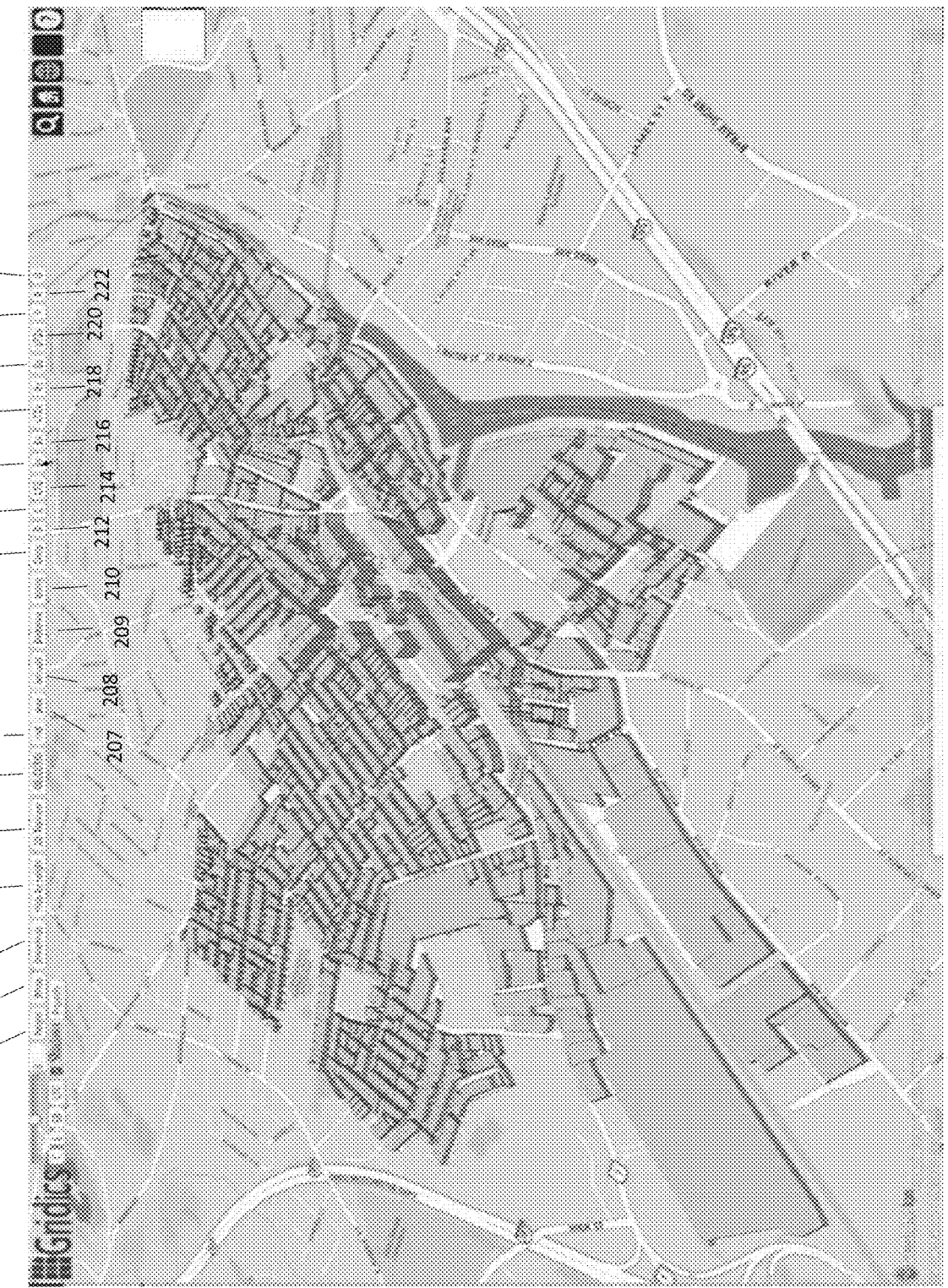
FIG. 21 illustrates a GUI showing a municipality according to one embodiment of the present invention.
Figure 22:
FIG. 22 illustrates a GUI showing a municipality according to one embodiment of the present invention.

As shown in FIG. 20, the system is capable of displaying a land assemblage. The graphical user interface is operable to display a color coded map to show which tracts of land are buildable. For example, and not limitation, the graphical user interface is operable to display white buildings to denote that a building is incompatible on a particular tract of land. The graphical user interface is designed to increase user efficiency and customization. The graphical user interface is configured to have buttons to turn on and off various functionalities of the graphical user interface, to change the view of the displayed map or to display information to the user. For example and not limitation, the buttons include height 200, white 201, show/hide 202, Hide by Height 203, 2D TopView 204, OBJECTID 205, end 206, area 207, latitude 208, distance 209, bldng 210, envlg 211, B 212, C 213, LTZ 214, Bx 215, Cx 216, LTZx 217, By 218, Cy 219, P 221, R 222, and O 223. As shown in FIGS. 21 and 22, the colors of the buildings change as the user changes the input requirements. The color depends on which zoning code has the largest development potential. In an example embodiment, the graphical user interface is operable to color code the buildings in a brighter color to symbolize that the colored buildings have high potential under the proposed zoning code and proposed building plan.

Figure 23:
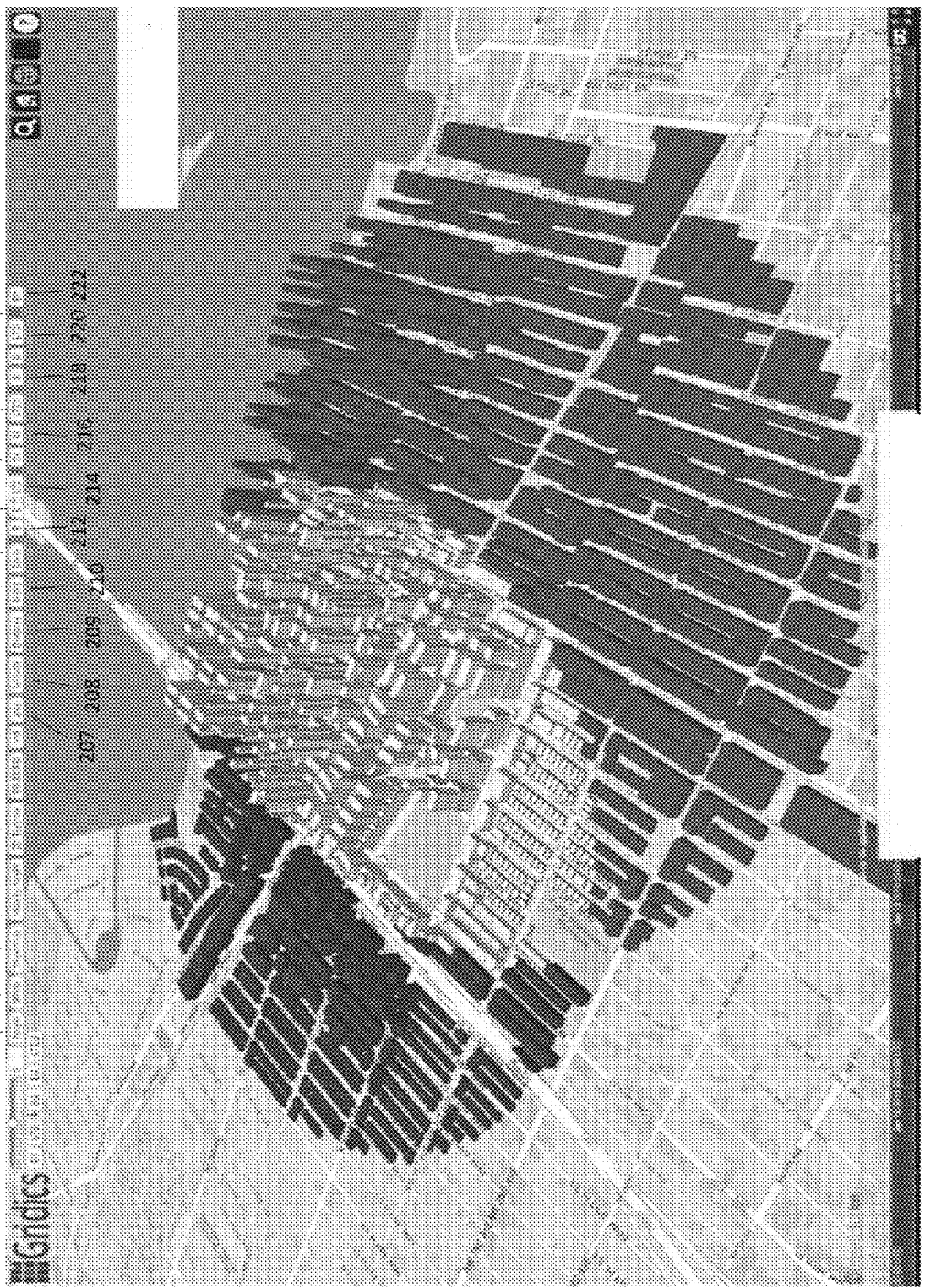
FIG. 23 illustrates a GUI showing a municipality according to one embodiment of the present invention.
Figure 24:
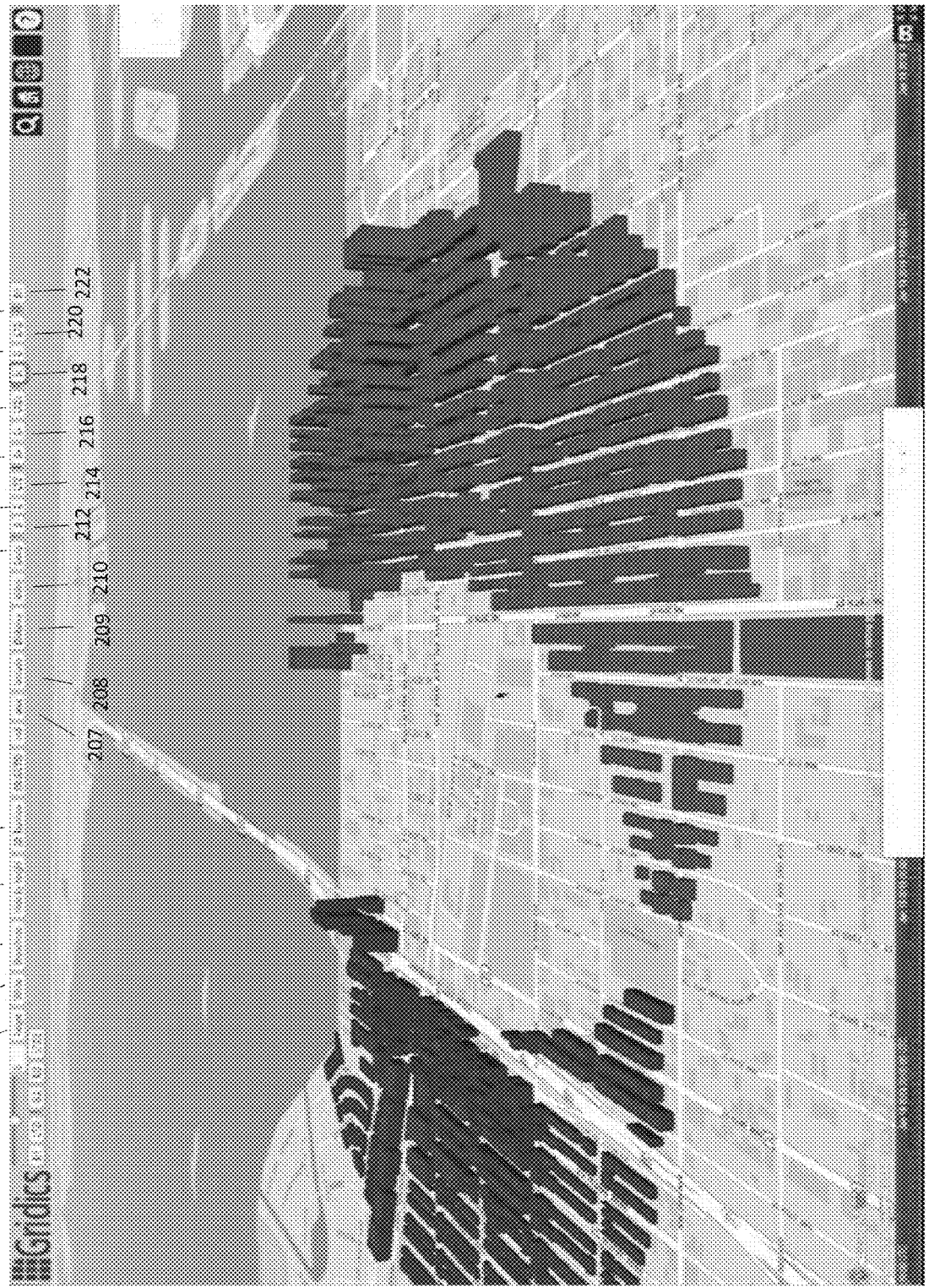
FIG. 24 illustrates a GUI showing a municipality according to one embodiment of the present invention.

As shown in the example embodiment in FIG. 23, the system is configured to display and search an entire city based on a user's proposed plan. The entire city is color coded to demonstrate which parts of the city are the most suitable for the proposed plan. For example, if a user wants to build a multifamily building, then the user can input the proposed building parameters for the multifamily building and use the system to search the city. In addition, the system is configured to include other parameters such as distance from a school or liquor store. Also, as shown in FIG. 24, the graphical user interface is configured to hide the structures that are incompatible with the proposed design. This improves user visibility and prior art does not disclose this functionality.

Figure 25:
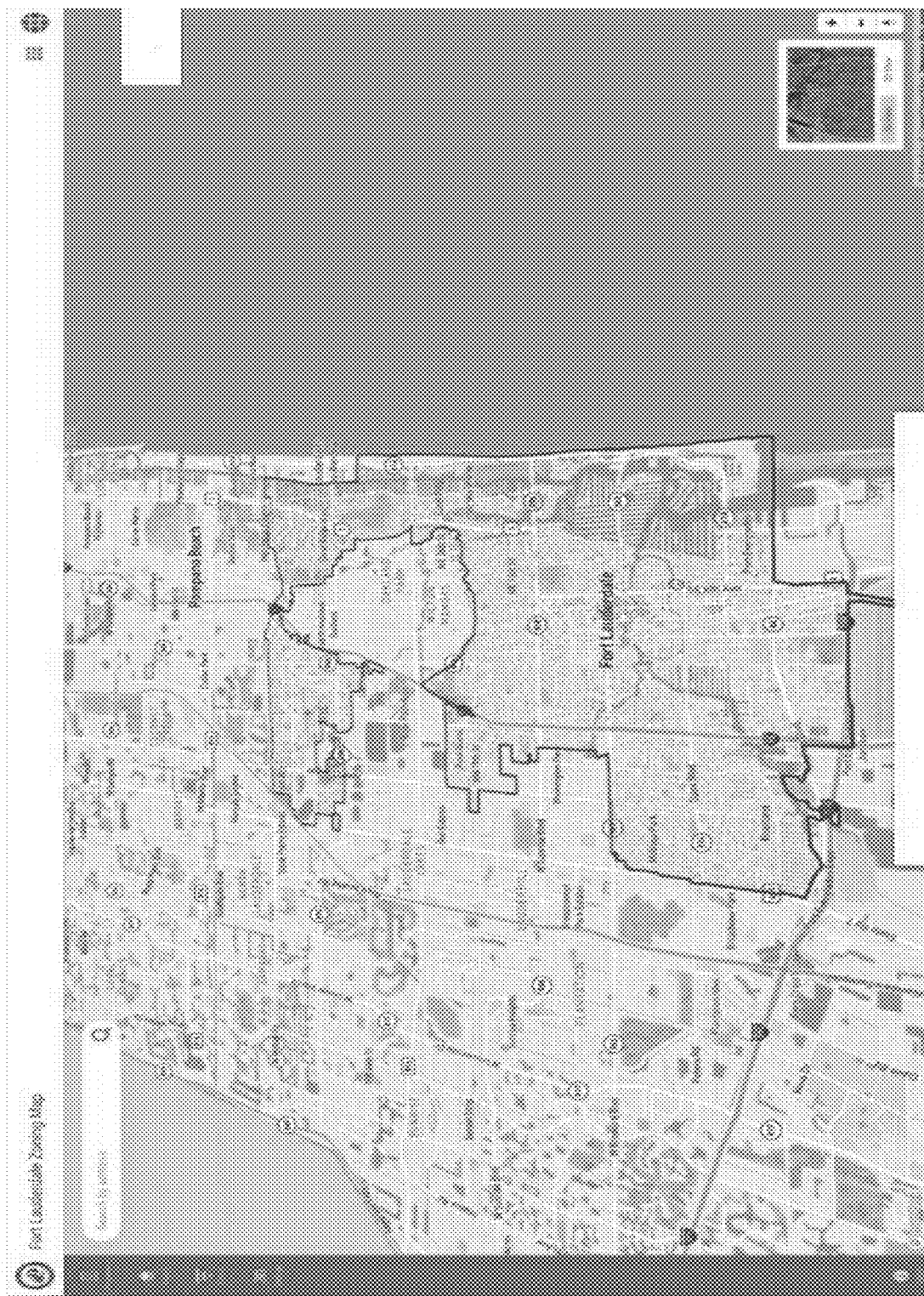
FIG. 25 illustrates a GUI showing a zoning map according to one embodiment of the present invention.
Figure 26:
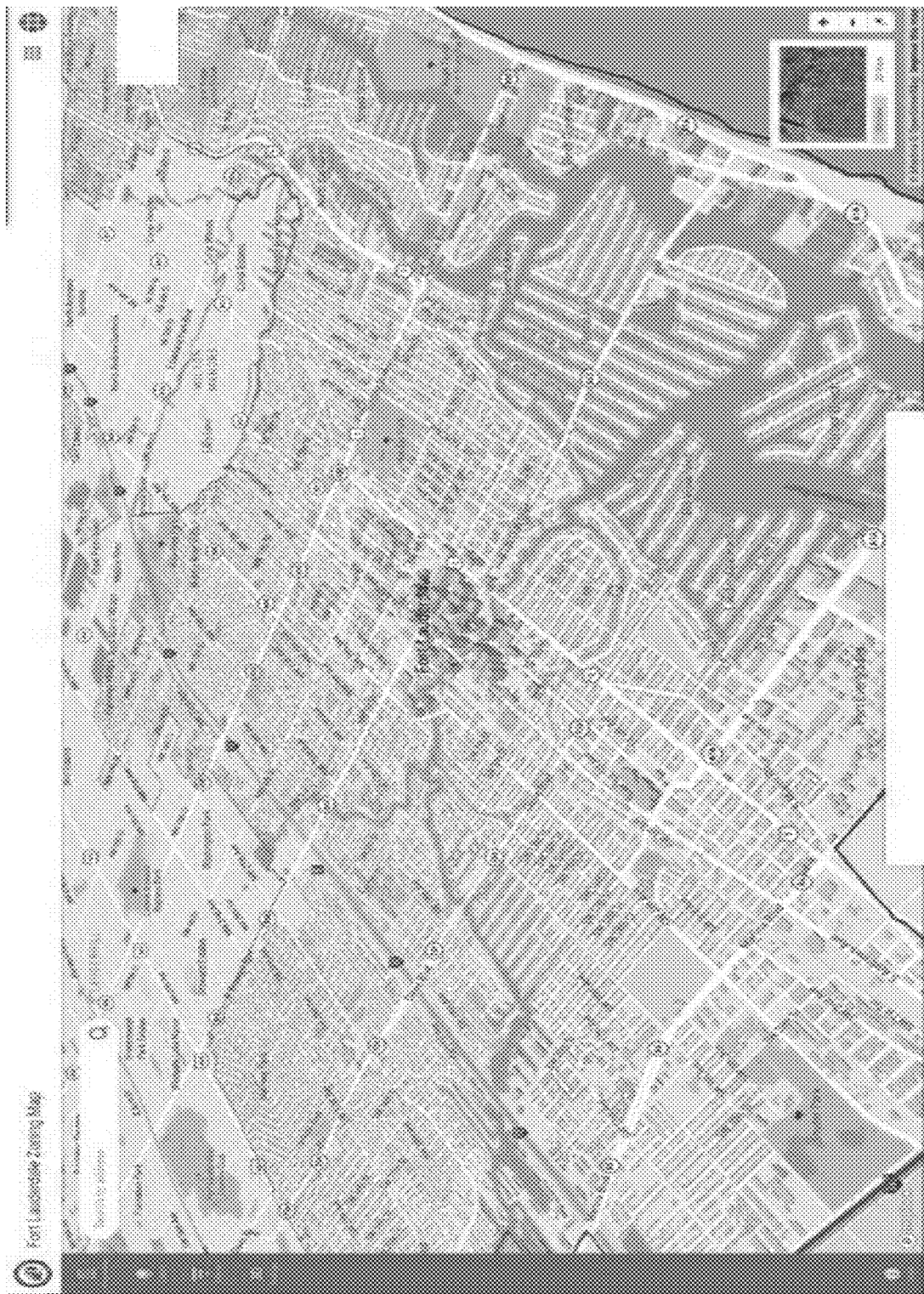
FIG. 26 illustrates a GUI showing a zoning map according to one embodiment of the present invention.
Figure 27:
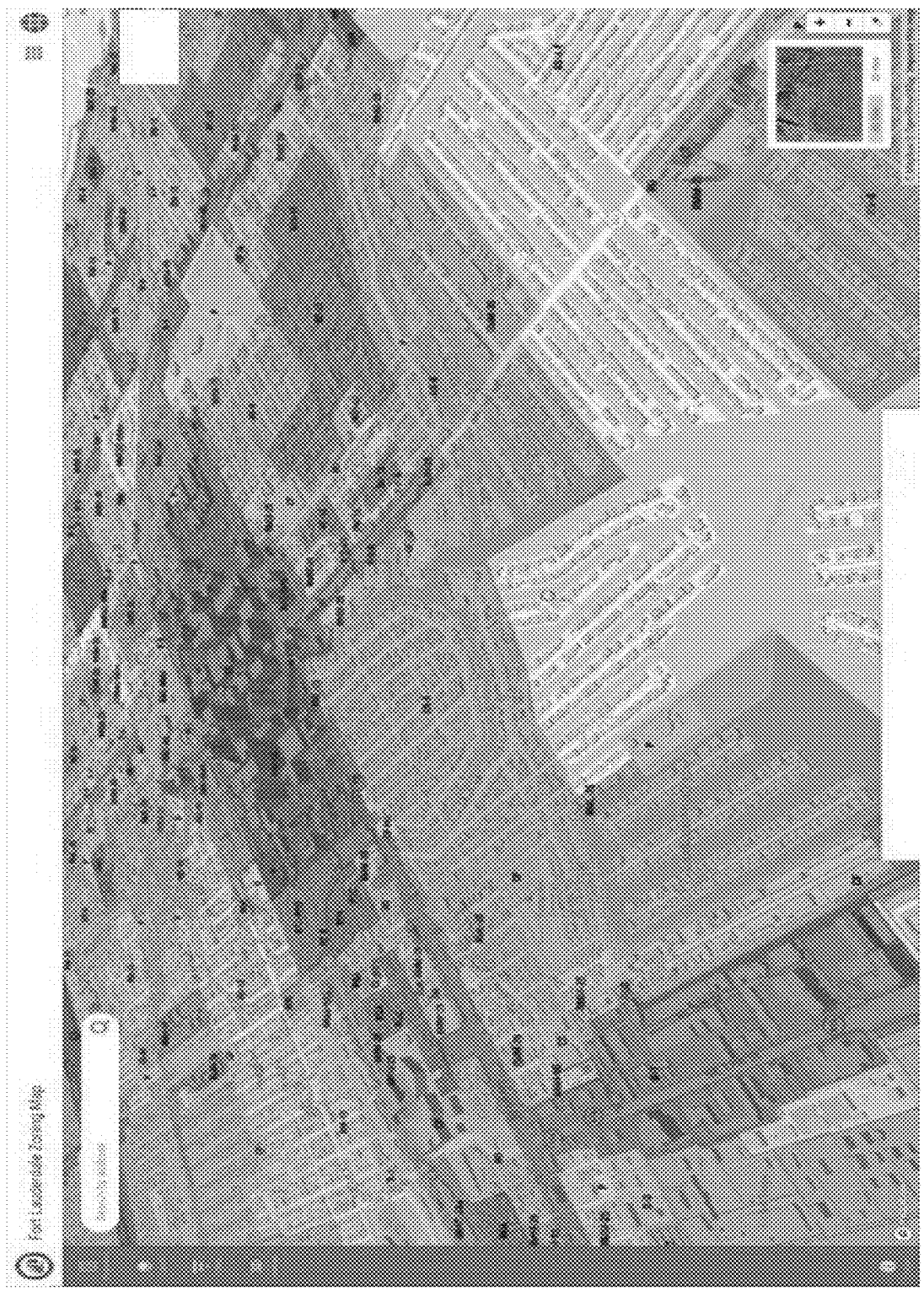
FIG. 27 illustrates a GUI showing a municipality with color coded zoning districts according to one embodiment of the present invention.
Figure 28:
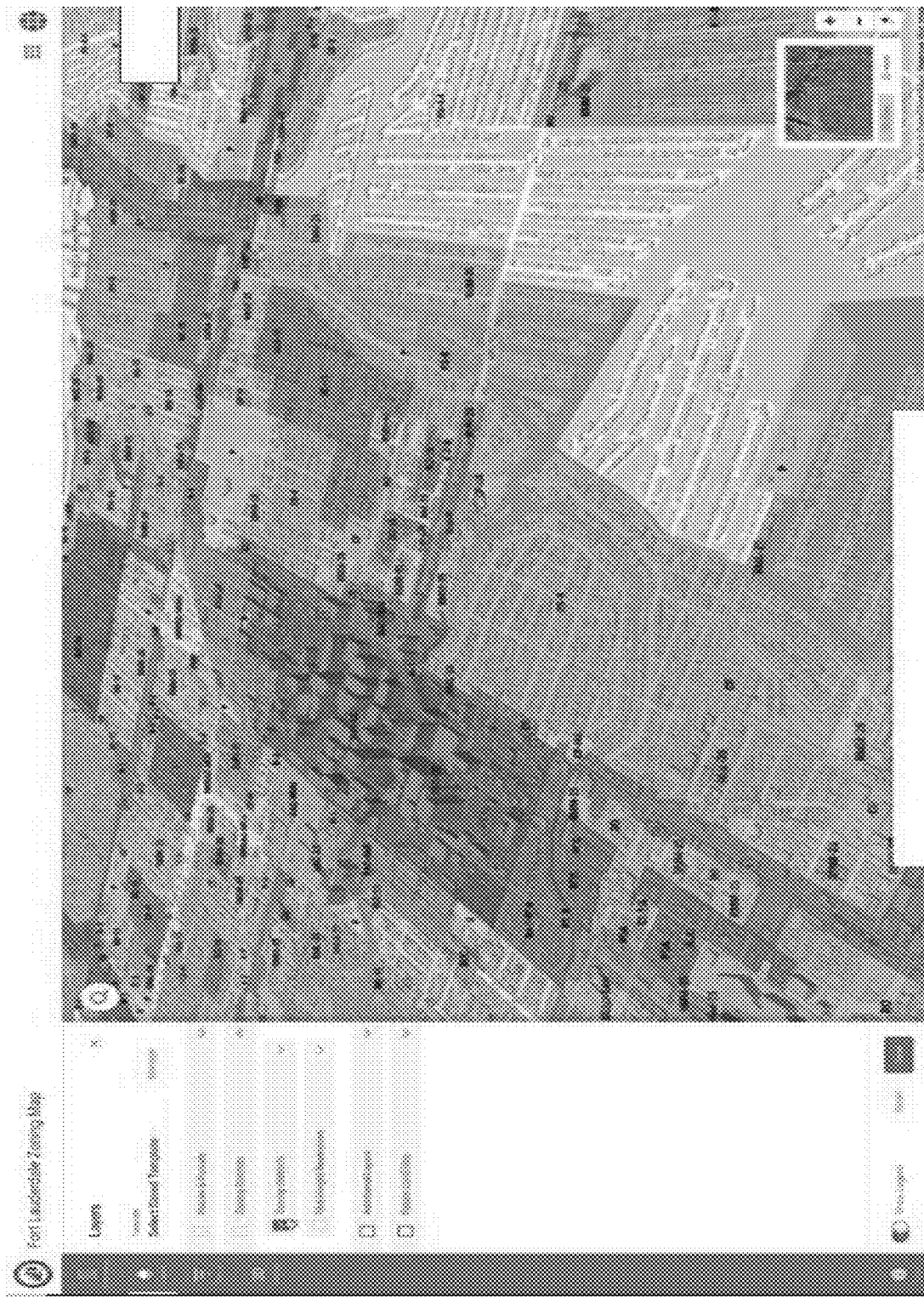
FIG. 28 illustrates a GUI showing a municipality with color coded zoning districts according to one embodiment of the present invention.
Figure 29:
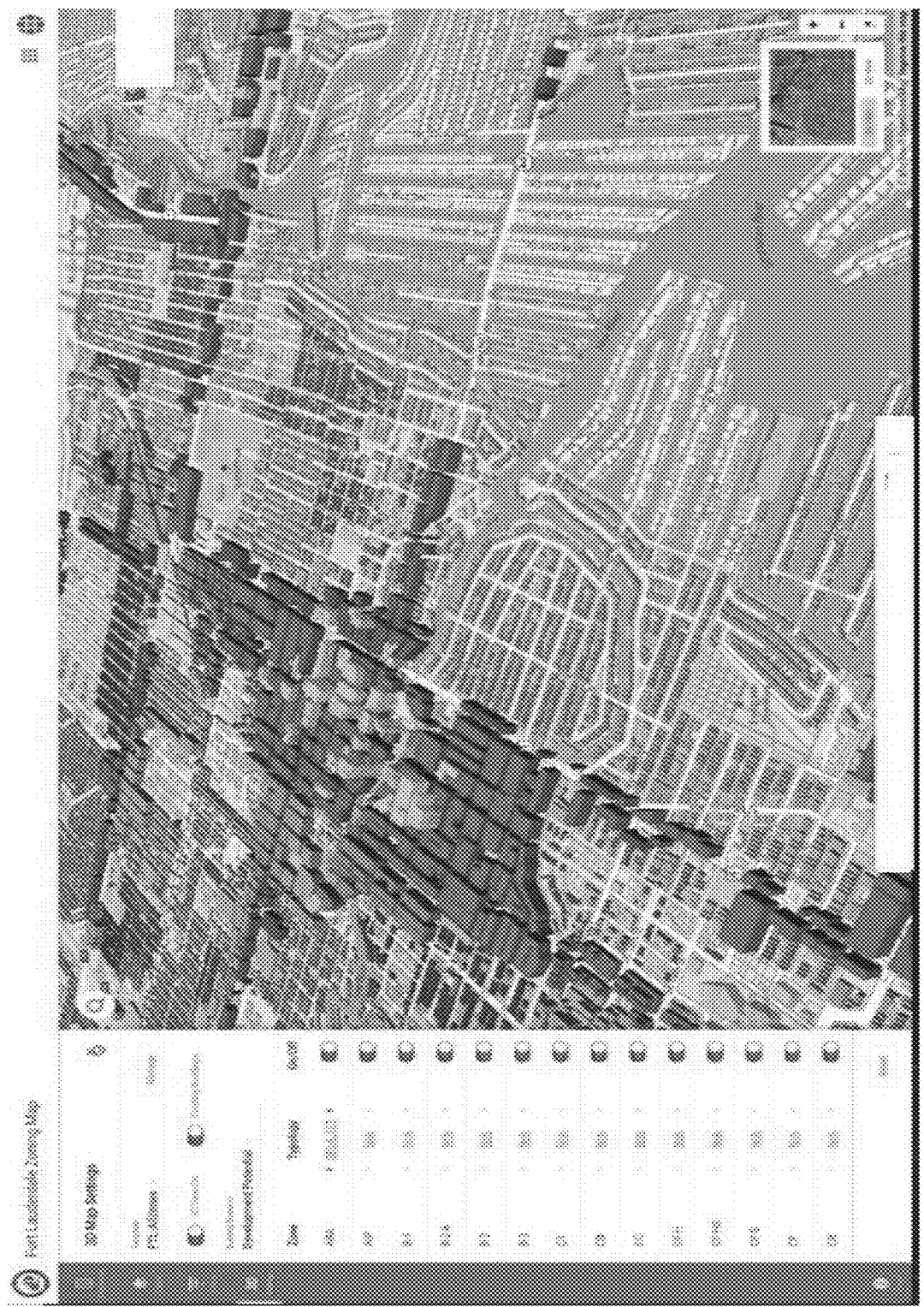
FIG. 29 illustrates a GUI showing a municipality with color coded zoning districts according to one embodiment of the present invention.

FIG. 25 is an illustrated embodiment of a zoning map for an entire city. In this example embodiment, the system is configured to search the city by address, provide various visual layers, and 3D representations. As shown in FIG. 26, a user can distinguish between bodies of water, parks, and roads. FIG. 27 is an illustrated embodiment, wherein the graphical user interface is operable to display an entire city and color code and label each of the zoning districts. In another exemplary embodiment, the graphical user interface is operable to turn on and off various layers of its display. For example, as shown in FIG. 28, the graphical user interface is operable to turn on or off places and parcels, zoning districts, additional layers, and future land use. FIG. 29 is an illustrated embodiment, wherein the system is configured to display the zoning code for each tract of land on the map and color code the different zones in order to improve visualization. The system is configured to allow a user to turn zones on and off, as well as the existing buildings and 3D view.

Figure 30:
FIG. 30 illustrates a GUI showing the property detail results of a user search on a municipality according to one embodiment of the present invention.
Figure 31:
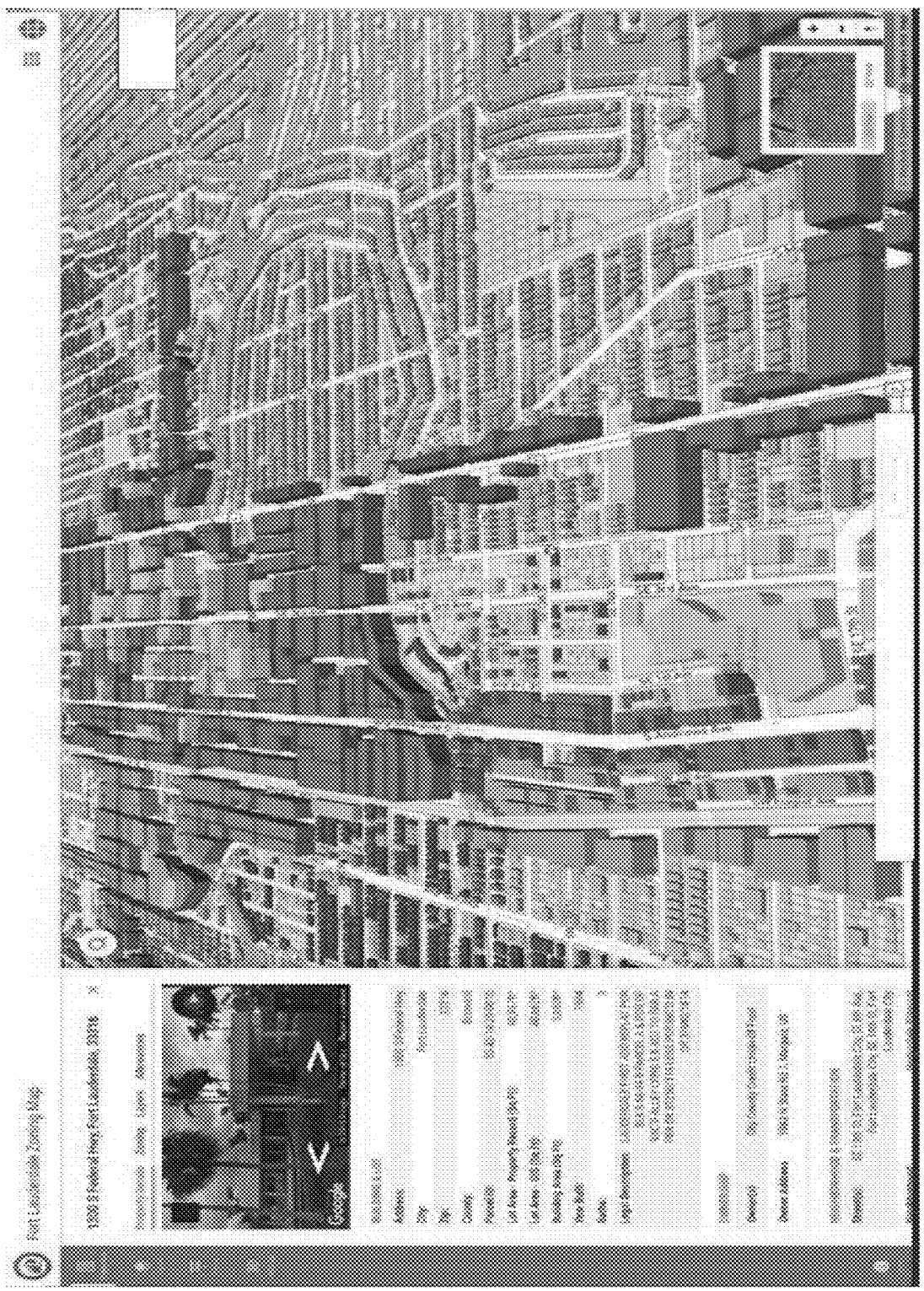
FIG. 31 illustrates a GUI showing the property detail results of a user search on a municipality according to one embodiment of the present invention.
Figure 32:
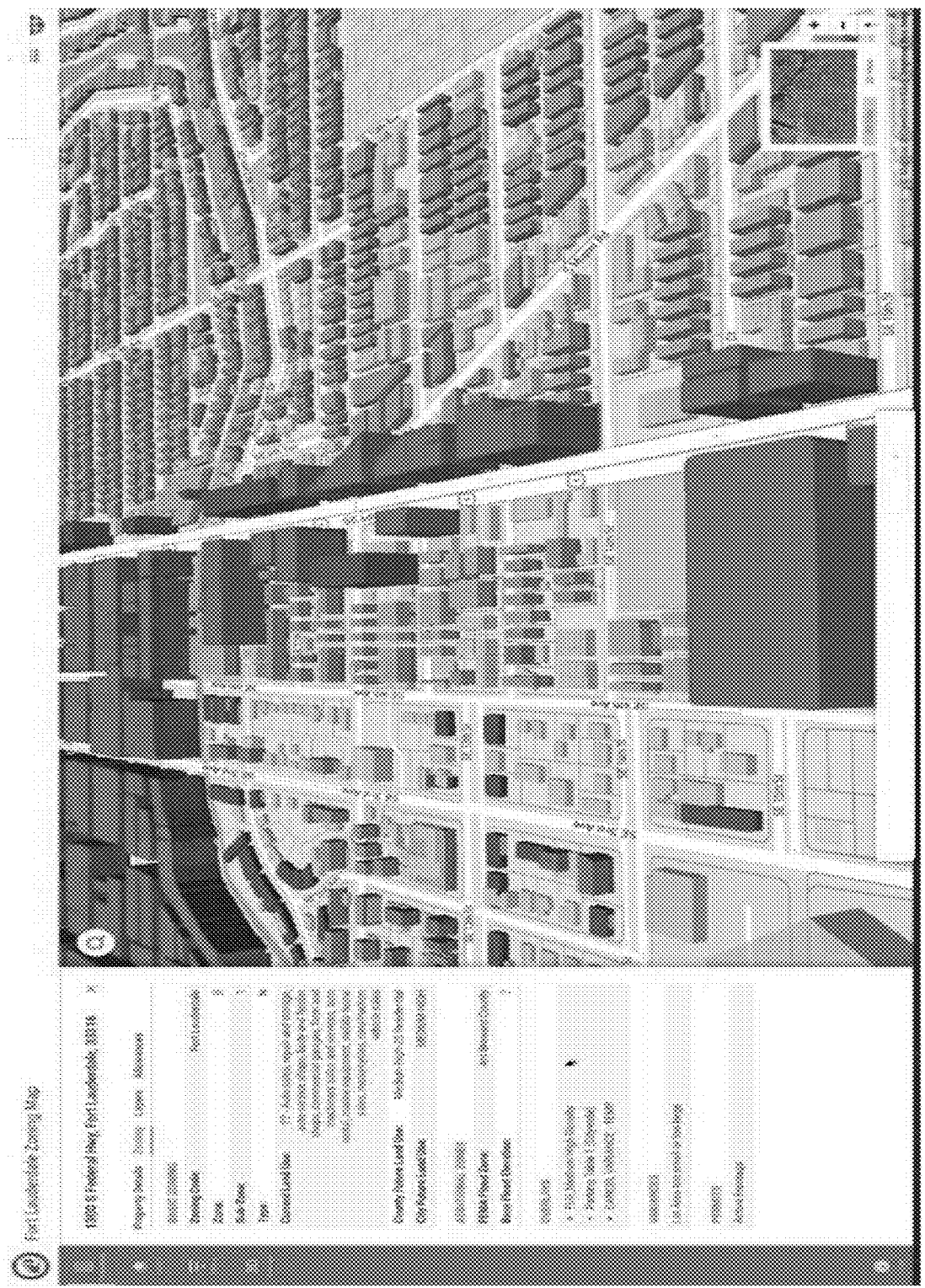
FIG. 32 illustrates a GUI showing the zoning results of a user search on a municipality according to one embodiment of the present invention.
Figure 33:
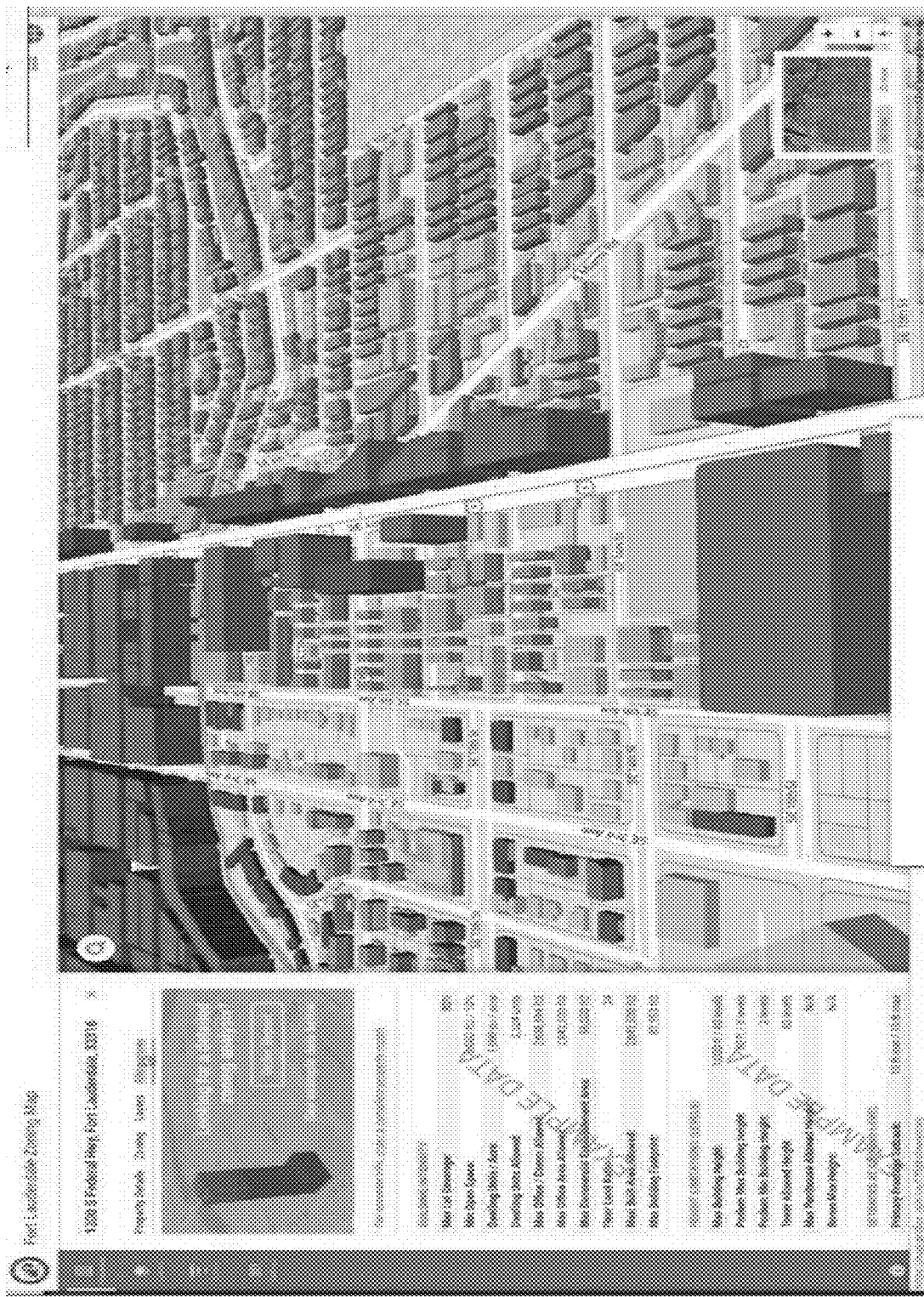
FIG. 33 illustrates a GUI showing the allowances of a user search on a municipality according to one embodiment of the present invention.

In FIG. 30, the graphical user interface is operable to display the relevant geographic information when a user selects a particular tract of land. In addition, the system is configured to display other information such as legal description, ownership, neighborhood and transportation. As shown in FIG. 31, the system is configured to keep the tract of land highlighted, even when the user zooms out. Also, the system is operable to analyze and inform the user about the allowances of the building intensity, height limitations, and setbacks at ground level. The system is operable to notify a user of any encumbrances on the land. For example, encumbrances include security interests on the tract of land such as mortgages and liens as well as land use encumbrances such as easements. As shown in FIG. 32, the graphical user interface is operable to display the zoning information. The zoning information includes the zoning code, zone, sub-zone, current land use, county future land use, city future land use, flood zone, zoning overlays, zoning variances, and permits. As shown in FIG. 33, the graphical user interface is operable to displace the allowances for the property of interest.

Figure 34:
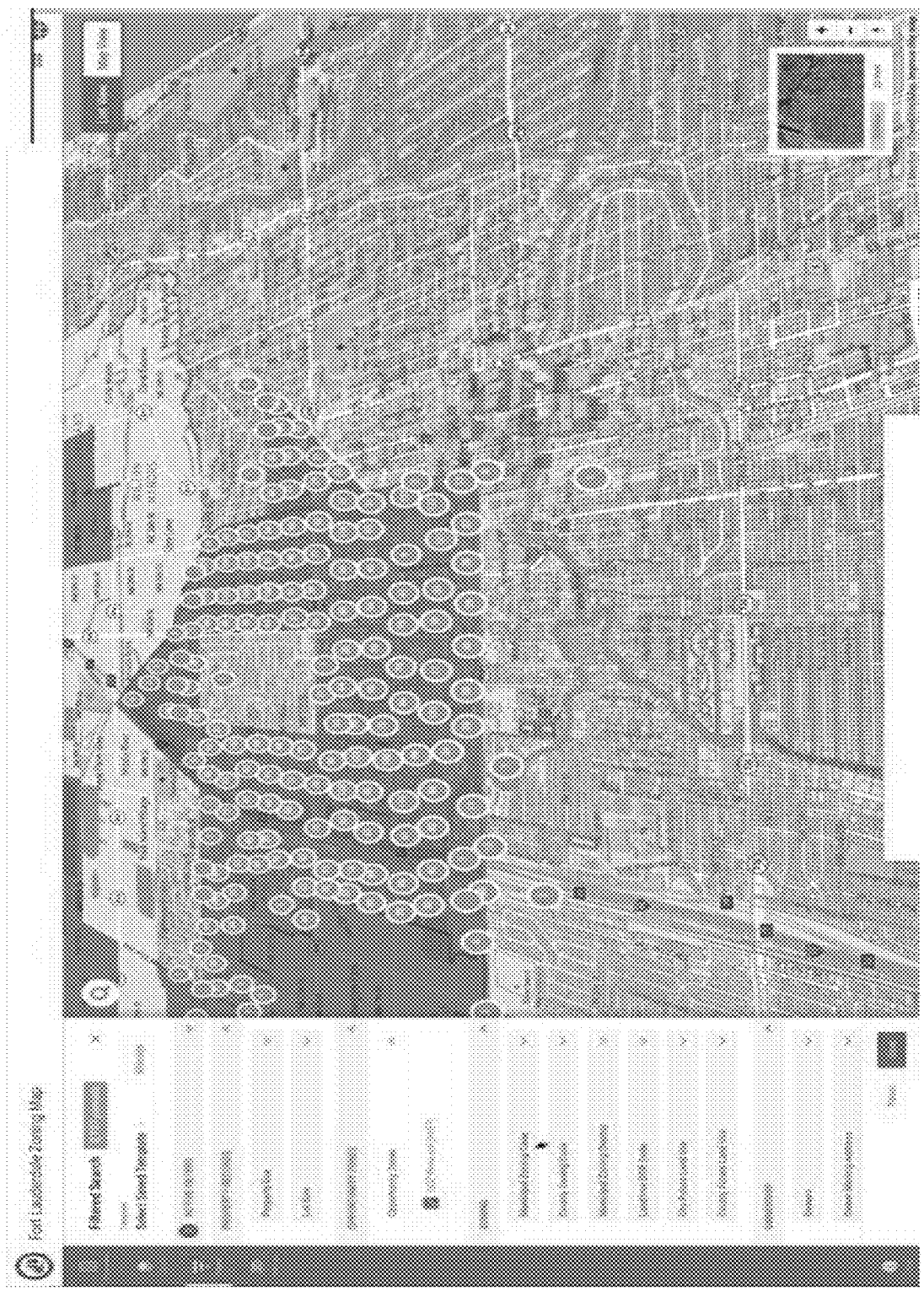
FIG. 34 illustrates a GUI showing potential properties corresponding to a user search on a municipality according to one embodiment of the present invention.
Figure 35:
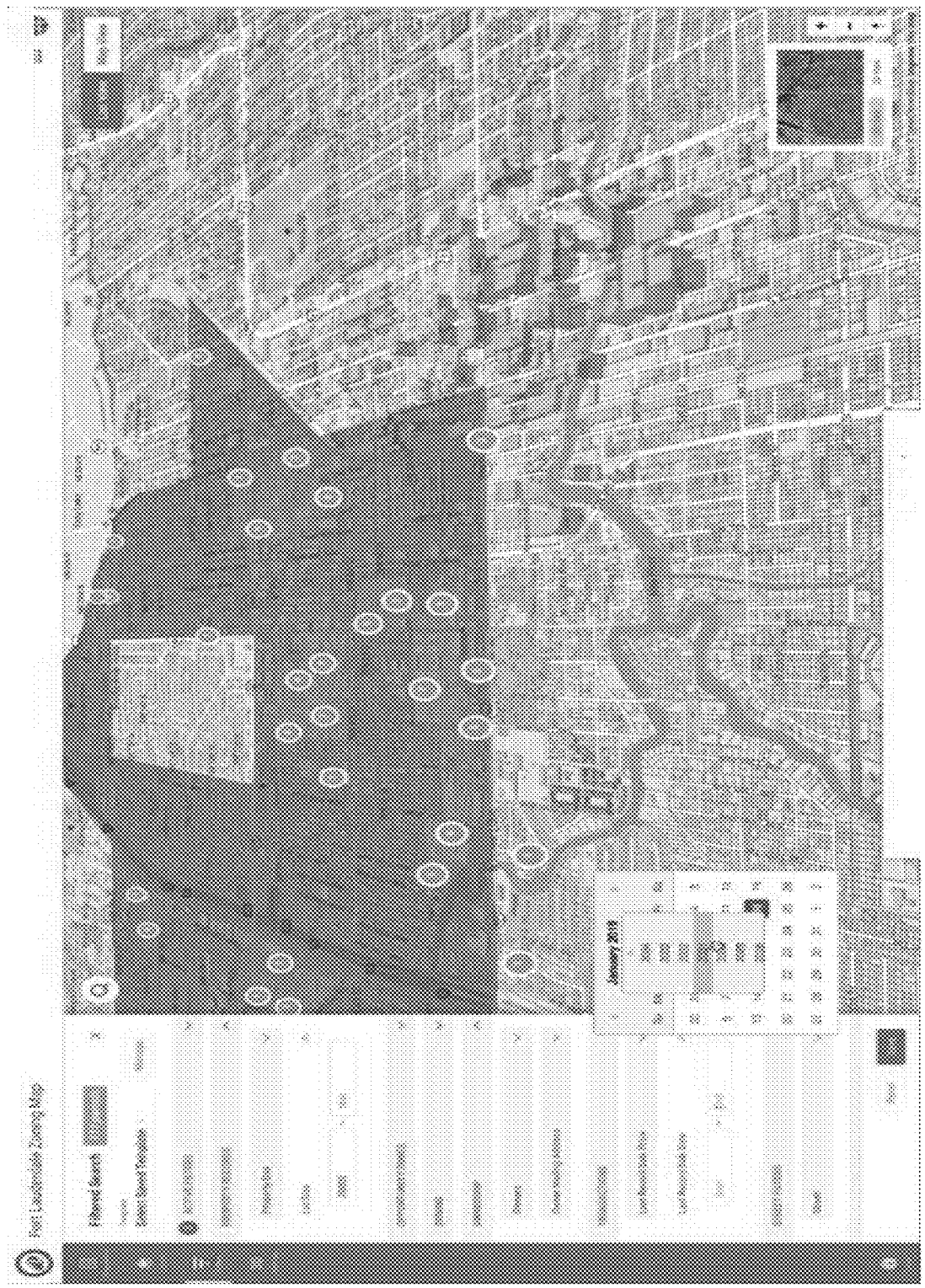
FIG. 35 illustrates a GUI showing potential properties corresponding to a user search limited by transaction dates on a municipality according to one embodiment of the present invention.

FIG. 34 is an exemplary embodiment of the search and filter function of the present invention. The graphical user interface is operable to filter and search tracts of land based on property use and lot size. The graphical user interface is also operable to filter based on opportunity zones and zoning such as municipal zoning code, county zoning code, municipal zoning overlay, land use Department of Revenue (DOR) code, city future land use, and county future land use. Another filter is ownership information such as owners and owner mailing address. In addition, as shown in FIG. 35, the graphical user interface can filter by transactions such as last record sale price and last record sale date. The graphical user interface is operable to filter and search tracts of land by building parameters such as area, density, development, floor area ratio, folio number, jurisdiction, land use type, max height, max lot coverage, minimum lot size, minimum lot width, quantity of properties, quantity of transit routes, quantity of transit stops, street, total property size, water body and water body type. The system is configured to display, via the graphical user interface, the properties that meet the user's filters. The properties are highlighted on the visual representation of the city and the compatible properties are classified based on how closely they satisfy the user's parameters. For example, the graphical user interface is operable to display compatible properties, wherein the results are shown with numbers representing the amount of properties matching these search parameters in an area. As the user gets closer, these number clusters change until each property can be seen individually.

Figure 36:
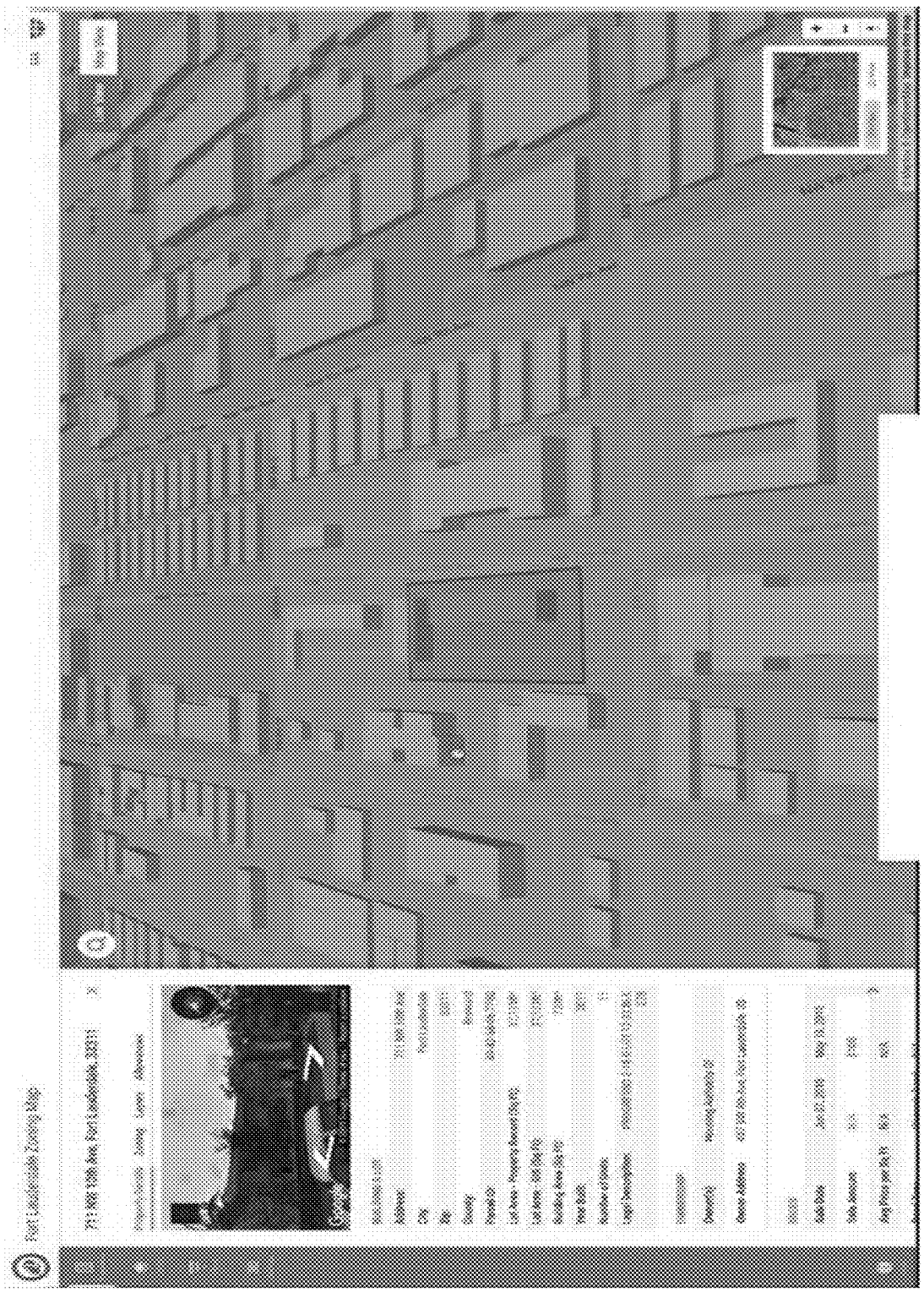
FIG. 36 illustrates a GUI showing the results of a user search for a municipality according to one embodiment of the present invention.

In another embodiment, FIG. 36 shows an exemplary search result. The graphical user interface is operable to display the search results in multiple views. Those views include a map view and a list view. The graphical user interface is also operable to show the actual street view of a tract of land. The graphical user interface is configured to rotate the street view so a user sees the full surroundings of the tract of land. In addition, the graphical user interface is operable to allow a user to move away from the location via the street view. For example, if a user wanted to see what route they would have to take to get to a nearby school, then they could virtually travel by moving through the street view.

As shown in FIG. 37 and FIG. 38, the present invention includes access to the zoning code of the city of interest. The present invention includes explanations on what the zoning code means in order to enable an ordinary user to understand the zoning code.

In yet another embodiment, the present invention includes a compliance function, wherein the system is configured to determine whether a proposed building plan is in compliance with the zoning requirements. In addition, the present invention is configured to determine whether a proposed building plan is in compliance with building code, fire code and other regulatory requirements. The system is configured to provide real-time feedback on the proposed building plan.

In another embodiment, the system is configured to analyze the potential effects of a proposed building plan on utilities such as water, sewer and electricity. This enables a user to determine if their proposed building plan is sufficient for long term duration. The system is also configured to provide solutions to potential problems arising either from nonconformity with zoning code or from the use of utilities services. For illustration and not limitation, the system is configured to predict the need for a power plant and a water treatment plant in response to the proposed building plan.

In another embodiment, the system is operable to perform real-time analysis on the future effects on a tract of land given the current land use. For example, the graphical user interface is configured to notify a user if a current building plan will cause potential issues to the tract of land or create issues with utilities service. This allows a user to recognize problems that they would have otherwise been unaware. The system is then operable to provide recommendations to prevent the negative effects from occurring. These recommendations include calibrating every street, parcel, parking infrastructure and resources allocation, utilities, schools and other parameters that affect the land use and development.

In another embodiment the present invention is configured to provide zoning overlays. The system is configured to display on the graphical user interface additional geometrics that show the zoning requirements. For example, and not limitation, the graphical user interface is operable to display a circle within a train station region to demonstrate special zoning requirements near the train station.

In another embodiment, the system creates a 3D representation of a proposed building plan by first selecting a parcel either by a geographic identification, an address or a click select from a location displayed on the graphical user interface. The system is configured to create a generic architecture based on the actual maximum lot capacity, density, building area and envelope of the building. The system is operable to use other variables in its analysis, such as no liquor store within a user defined distance from the property of interest. The system has the following rules: zoning rules, overlay rules, proximity rules, capacity rules and planning rules. The rules are applied in the following order when creating the 3D visual representation: zoning, overlay, proximity, capacity, and planning.

FIG. 39 is a schematic diagram of an embodiment of the invention illustrating a computer system, generally described as 3800, having a network 3810, a plurality of computing devices 3820, 3830, 3840, a server 3850, and a database 3870.

The server 3850 is constructed, configured, and coupled to enable communication over a network 3810 with a plurality of computing devices 3820, 3830, 3840. The server 3850 includes a processing unit 3851 with an operating system 3852. The operating system 3852 enables the server 3850 to communicate through network 3810 with the remote, distributed user devices. Database 3870 is operable to house an operating system 3872, memory 3874, and programs 3876.

In one embodiment of the invention, the system 3800 includes a network 3810 for distributed communication via a wireless communication antenna 3812 and processing by at least one mobile communication computing device 3830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 3800 is a virtualized computing system capable of executing any or all aspects of software and/or application components presented herein on the computing devices 3820, 3830, 3840. In certain aspects, the computer system 3800 is operable to be implemented using hardware or a combination of software and hardware, either in a dedicated computing device, or integrated into another entity, or distributed across multiple entities or computing devices.

By way of example, and not limitation, the computing devices 3820, 3830, 3840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 3820 includes components such as a processor 3860, a system memory 3862 having a random-access memory (RAM) 3864 and a read-only memory (ROM) 3866, and a system bus 3868 that couples the memory 3862 to the processor 3860. In another embodiment, the computing device 3830 is operable to additionally include components such as a storage device 3890 for storing the operating system 3892 and one or more application programs 3894, a network interface unit 3896, and/or an input/output controller 3898. Each of the components is operable to be coupled to each other through at least one bus 3868. The input/output controller 3898 is operable to receive and process input from, or provide output to, a number of other devices 3899, including, but not limited to, alphanumeric input devices, mice, electronic styluses, display units, touch screens, signal generation devices (e.g., speakers), or printers.

By way of example, and not limitation, the processor 3860 is operable to be a general-purpose microprocessor (e.g., a central processing unit (CPU)), a graphics processing (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 3840 in FIG. 39, multiple processors 3860 and/or multiple buses 3868 are operable to be used, as appropriate, along with multiple memories 3862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 3800 is operable to operate in a networked environment using logical connections to local and/or remote computing devices 3820, 3830, 3840 through a network 3810. A computing device 3830 is operable to connect to a network 3810 through a network interface unit 3896 connected to a bus 3868. Computing devices are operable to communicate communication media through wired networks, direct-wired connections or wirelessly, such as acoustic, RF, or infrared, through an antenna 3897 in communication with the network antenna 3812 and the network interface unit 3896, which are operable to include digital signal processing circuitry when necessary. The network interface unit 3896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 3862, the processor 3860, and/or the storage media 3890 and is operable be a single medium or multiple media (e.g., a centralized or distributed computer system) that store the one or more sets of instructions 3900. Non-transitory computer readable media includes all computer readable media, with the sole exception being a transitory, propagating signal per se. The instructions 3900 are further operable to be transmitted or received over the network 3810 via the network interface unit 3896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 3890 and memory 3862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 3800.

In one embodiment, the computer system 3800 is within a cloud-based network. In one embodiment, the server 3850 is a designated physical server for distributed computing devices 3820, 3830, and 3840. In one embodiment, the server 3850 is a cloud-based server platform. In one embodiment, the cloud-based server platform hosts serverless functions for distributed computing devices 3820, 3830, and 3840.

In another embodiment, the computer system 3800 is within an edge computing network. The server 3850 is an edge server, and the database 3870 is an edge database. The edge server 3850 and the edge database 3870 are part of an edge computing platform. In one embodiment, the edge server 3850 and the edge database 3870 are designated to distributed computing devices 3820, 3830, and 3840. In one embodiment, the edge server 3850 and the edge database 3870 are not designated for distributed computing devices 3820, 3830, and 3840. The distributed computing devices 3820, 3830, and 3840 connect to an edge server in the edge computing network based on proximity, availability, latency, bandwidth, and/or other factors.

It is also contemplated that the computer system 3800 is operable to not include all of the components shown in FIG. 39, is operable to include other components that are not explicitly shown in FIG. 39, or is operable to utilize an architecture completely different than that shown in FIG. 39. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The present invention is directed to determining an actual maximum density capacity and development potential in view of the zoning code applicable to a particular location. When the present invention is considered as a whole, the systems and methods focus on using a variety of sources of zoning information to provide real-time analysis and customization of the building potential of an area. This includes providing a customizable 3-D representation to aid a user with visualizing the current effect of zoning codes and the future impact of zoning code changes. Without the use of software and the graphical user interface, these 3-D representations and the other visualizations provided by the claimed invention are not possible. Therefore, the claimed invention uses mathematical concepts and computer-related devices to improve real-time land development analysis.

Furthermore, the graphical user interface is improved by using adjustable sliders then enable a user to increase/decrease and incorporate numerous parameters in the real-time calculation of actual maximum density capacity and the real-time display of a 3D view of a building on the geographic area of interest. The slider in a single action greatly improves the ability of the GUI to interact with the user and overlaying existing content in the GUI. The interactive slider interface improves the ability of the computer to display information in a single display rather than redirecting to multiple reports or displays.

In addition, the present invention is focused on a specific asserted improvement in determining development potential. The present invention directed to a patentable, technological improvement over the existing, methods, systems and process. The present invention uses the limited rules in a process specifically designed to achieve an improved technological result in a conventional industry practice.

Prior art does not teach or disclose the combination of customization, optimization, and display interfaces that are present in the claimed invention. The present invention does more than perform analysis on zoning codes and other information from geographic information system (GIS) and other outside information sources, it provides customizable graphical user interfaces that enables a user to determine the potential of land in real-time.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for real-time analysis of a geographic area of interest comprising:
a computing platform constructed and configured for network communication with at least one remote device and at least one database, wherein the computing platform comprises a search module, an analytics module, and a compliance module;
wherein the at least one remote device comprises a graphical user interface (GUI), software, memory, and a processor;
wherein the software is executed by the processor;
wherein the computing platform is configured to collect and transmit data corresponding to the geographic area of interest;
wherein the data corresponding to the geographic area of interest includes geographic data, regulatory data, environmental data, building data, and custom data;
wherein the custom data includes building input parameters;
wherein the GUI is configured to receive the data corresponding to the geographic area of interest;
wherein the GUI includes adjustable sliders, touchscreen input, and click selection for receiving geographic data, regulatory data, environmental data, building data, and custom data;
wherein the at least one remote device is configured to transmit data to the computing platform;
wherein the computing platform is configured to, using the data corresponding to the geographic area of interest, generate at least one building envelope, at least one 3D view for the at least one building envelope, and at least one 3D view for the geographic area of interest;
wherein the at least one 3D view for the geographic area of interest includes the at least one 3D view of the at least one building envelope and a real-world aerial photographic view of the geographic area of interest including a real-world aerial photographic view of preexisting buildings in the geographic area of interest;
wherein the at least one 3D view for the geographic area of interest is updated in real-time based on changes in the data corresponding to the geographic area of interest;
wherein the computing platform is further configured to generate building analysis data;
wherein the building analysis data includes the maximum actual building potential of the geographic area of interest;
wherein the maximum actual building potential includes a maximum lot capacity, a maximum density, a maximum building area and a maximum building envelope;
wherein the computing platform is configured to transmit the at least one building envelope data and at least one 3D view for the geographic area of interest to the at least one remote device;
wherein the computing platform is configured to color code the at least one 3D view for the geographic area of interest based on the custom data;
wherein the GUI is configured to display the at least one building envelope and the at least one color-coded 3D view for the geographic area of interest;
wherein the GUI is operable to allow modification of the shape, size, height, and width of the at least one 3D view for the at least one building envelope via selecting and dragging elements of the at least one 3D view for the at least one building envelope;

wherein the GUI is further configured to display a multiplicity of buildings on the geographic area of interest;

wherein the multiplicity of buildings includes the at least one building envelope and the preexisting buildings;

wherein the computing platform is configured to determine in real-time if the at least one building envelope is allowable under at least one zoning code and/or at least one environmental factor for the geographic area of interest;

wherein the GUI is further configured to display multiple 3D models of buildings simultaneously for one lot, wherein each of the multiple 3D models of buildings is translucent;

wherein the computing platform is configured to identify the custom data which is not compliant with the at least one zoning code and/or the at least one environmental factor for the geographic area of interest, wherein the computing platform provides recommendations to make the custom data compliant with the at least one zoning code and/or the at least one environmental factor for the geographic area of interest;

wherein the at least one zoning code is operable to be modified in real-time and wherein the computing platform is operable to determine in real-time if the at least one building envelope is allowable under the at least one modified zoning code;

wherein the GUI further includes an actual street view for the geographic area of interest;

wherein the GUI is configured to provide for rotation of the street view to view surroundings in the geographic area of interest;

wherein the GUI provides for updating the custom data to create updated custom data;

wherein the computing platform is configured to analyze the updated custom data in real-time;

wherein the computing platform is configured to update the building analysis data in real-time based on the updated custom data; and wherein the computing platform is further configured to update the building analysis data in real-time based on the at least one 3D view for the at least one building envelope, wherein updated building analysis data is generated in real-time upon modification of the at least one 3D view for the at least one building envelope.

2. The system of claim 1, wherein the computing platform is configured to search a multiplicity of geographic areas of interest based on the at least one zoning code, the at least one building envelope, and the custom data, and wherein the computing platform is configured to determine a geographic area of interest of the multiplicity of geographic areas of interest that best matches the custom data.

3. The system of claim 1, wherein the GUI is operable to search for the geographic area of interest based on property dimensions, area, demographics, zoning designation, abutting streets, allowed density, allowed intensity, allowed non-residential uses, allowed height, allowed buildable area, and/or geolocation characteristics.

4. The system of claim 1, wherein the computing platform is configured to identify non-compliant custom data, wherein the non-compliant custom data is not allowable under the zoning code and/or the maximum actual building potential, wherein the computing platform is configured to send alerts about the non-compliant custom data to the at least one remote device, wherein the GUI is operable to displays alerts about the non-compliant custom data.

5. The system of claim 1, wherein the GUI is configured to receive a selection for the geographic area of interest, wherein the computing platform is configured to collect and transmit legal data for the geographic area of interest to the GUI, wherein the GUI is configured to display the legal data, and wherein the legal data includes legal description data, ownership data, neighborhood data, transportation data, and encumbrance data.

6. The system of claim 1, wherein the GUI is configured to filter a multiplicity of geographic areas of interest by property use, lot size, municipal zoning code, county zoning code, municipal zoning overlay, land use, Department of Revenue (DOR) code land use, city future land use, county future land use, last record sale price, and/or last record sale date.

7. The system of claim 1, wherein the environmental factors include the topography, soil conditions, and climate of the geographic area of interest.

8. The system of claim 1, wherein the GUI is operable to receive a selection of a multiplicity of geographic areas of interest, wherein the computing platform is configured to analyze individual and combined geographic areas of interest of the multiplicity of geographic areas of interest, and wherein the computing platform is further configured to determine a combination of geographic areas of interest of the multiplicity of geographic areas of interest that are operable to support the at least one building envelope.

9. The system of claim 1, wherein the computing platform is configured to color code tracts of the geographic area of interest based on whether or not the tracts of geographic area of interest are operable to support the building input parameters.

10. The system of claim 1, wherein the GUI is operable to display a multi-tract building, wherein the GUI is operable to allow modification of building elements on individual tracts and/or buildings that comprise the multi-tract building.

11. The system of claim 1, wherein the computing platform is configured to determine infrastructure demands on the geographic area of interest and wherein the computing platform is configured to recommend changes to increase or decrease the infrastructure demands.

12. The system of claim 1, wherein the computing platform is configured to search a multiplicity of geographic areas of interest for a first geographic area of interest within a distance of a second geographic area of interest, and wherein the computing platform is configured to determine if a part of the first geographic area of interest is operable to support the at least one building envelope.

13. A method for real-time analysis of a geographic area of interest comprising:

receiving data about a geographic area of interest, wherein the geographic area of interest data includes geographic data, environmental data, regulatory data, and custom data;

calculating, with a computing platform, at least one building envelope based on the custom data;

calculating, with the computing platform, a maximum actual building potential for a geographic area of interest;

determining if the geographic area of interest is operable to support the custom data;

wherein the computing platform is configured to send an alert to a graphical user interface (GUI);

wherein the GUI is configured to display the alert when the geographic area of interest is not operable to support the custom data;

providing recommendations to change the custom data;
wherein the geographic area of interest is operable to support the recommended changes to the custom data;
wherein the GUI further includes an actual street view for the geographic area of interest;
wherein the GUI is configured to provide for rotation of the street view to view surroundings in the geographic area of interest;
updating the custom data;
creating a 3D model of the geographic area of interest with the updated custom data;
receiving an input via the GUI, modifying the shape, size, height, and/or width of the at least one 3D model for the at least one building envelope via selecting and dragging elements of the at least one 3D model for the at least one building envelope;
updating, via the computing platform, the building analysis data in real-time based on the modified 3D model of the at least one 3D view for the at least one building envelope;
wherein the at least one 3D model for the geographic area of interest includes the at least one 3D model of the at least one building envelope and a real-world aerial photographic view of the geographic area of interest including a real-world aerial photographic view of preexisting buildings in the geographic area of interest; and
wherein the GUI is further configured to display multiple 3D models of buildings simultaneously for one lot, wherein each of the multiple 3D models of buildings is translucent.

14. The method of claim 13, wherein the GUI is operable to filter and search at least one geographic area of interest by building parameters; wherein the building parameters include area, density, development, floor area ratio, folio number, jurisdiction, land use type, max height, max lot coverage, minimum lot size, minimum lot width, quantity of properties, quantity of transit routes, quantity of transit stops, street, total property size, water body and water body type.

15. The method of claim 13, wherein the computing platform is configured to provide recommendations for a second geographic area of interest that is operable to support the custom data.

16. The method of claim 13 further comprising determining infrastructure demands on a geographic area of interest; wherein the computing platform is configured to recommend changes to increase or decrease infrastructure demands.

17. A system for real-time analysis of a geographic area of interest comprising:
a computing platform constructed and configured for network communication with at least one remote device and at least one database, wherein the computing platform comprises a search module, an analytics module, and a compliance module;
wherein the at least one remote device comprises a graphical user interface (GUI), software, memory, and a processor;
wherein the software is executed by the processor;
wherein the computing platform is configured to collect and transmit data corresponding to the geographic area of interest;
wherein the data corresponding to the geographic area of interest includes geographic data, regulatory data, environmental data, building data, and custom data;
wherein the building data includes a building type;
wherein the GUI is configured to receive the data corresponding to the geographic area of interest;
wherein the GUI further includes an actual street view for the geographic area of interest;
wherein the GUI is configured to provide for rotation of the street view to view surroundings in the geographic area of interest;
wherein the at least one remote device is configured to transmit data to the computing platform;
wherein the computing platform is further configured to generate building analysis data;
wherein the building analysis data includes a building envelope and the maximum actual building potential of the geographic area of interest;
wherein the maximum actual building potential includes a maximum lot capacity, a maximum density, a maximum building area, and a maximum building envelope;
wherein the computing platform is configured to determine if the at least one building envelope and the building type are allowable under at least one zoning code and/or at least one environmental factor for the geographic area of interest;
wherein the GUI is configured to display at least one 3D view for the at least one building envelope;
wherein the GUI is operable to allow modification of the shape, size, height, and width of the at least one 3D view for the at least one building envelope via selecting and dragging elements of the at least one 3D view for the at least one building envelope;
wherein the computing platform is configured to determine a different building type that is allowable under the at least one zoning code and/or at least one environmental factor;
wherein the GUI is configured to display multiple 3D models of buildings simultaneously for one lot, wherein each of the multiple 3D models of buildings is translucent;
wherein the GUI is configured for updating the custom data to create updated custom data;
wherein the computing platform is configured to analyze the updated custom data in real-time; and
wherein the computing platform is configured to update the building analysis data in real-time based on the updated custom data and the at least one 3D view of the at least one building envelope, wherein updated building analysis data is generated in real-time upon modification of the at least one 3D view for the at least one building envelope.

18. The system of claim 17, wherein the computing platform is configured to search a multiplicity of geographic areas of interest based on the at least one zoning code, the building envelope generated, and the custom data, and wherein the computing platform is configured to determine a geographic area of interest of the multiplicity of geographic areas of interest that best matches the custom data.

19. The system of claim 17, wherein the computing platform is configured to identify non-compliant custom data, wherein the non-compliant custom data is not allowable under the zoning code and/or the maximum actual building potential wherein the at least one computing platform is configured to send alerts about the non-compliant custom data to the at least one remote device, and wherein the GUI is operable to displays alerts about the non-compliant custom data.

20. The system of claim 17, wherein the GUI is operable to display a multi-tract building, wherein the GUI is operable to allow modification of building elements on individual tracts and/or buildings that comprise the multi-tract building.